United States Patent
Isobe et al.

(10) Patent No.: US 7,772,836 B2
(45) Date of Patent: Aug. 10, 2010

(54) DEVICE FOR DETECTING ABSOLUTE ANGLE OF MULTIPLE ROTATION AND ANGLE DETECTION METHOD

(75) Inventors: Hiroshi Isobe, Iwata (JP); Takayoshi Ozaki, Iwata (JP); Norihiko Sasaki, Iwata (JP)

(73) Assignee: NTN Corporation, Osaka (JP)

( * ) Notice: Subject to any disclaimer, the term of this patent is extended or adjusted under 35 U.S.C. 154(b) by 343 days.

(21) Appl. No.: 11/918,677

(22) PCT Filed: Apr. 10, 2006

(86) PCT No.: PCT/JP2006/307576

§ 371 (c)(1),
(2), (4) Date: Oct. 17, 2007

(87) PCT Pub. No.: WO2006/115029

PCT Pub. Date: Nov. 2, 2006

(65) Prior Publication Data

US 2009/0058400 A1    Mar. 5, 2009

(30) Foreign Application Priority Data

Apr. 18, 2005 (JP) ............................. 2005-119687
Apr. 19, 2005 (JP) ............................. 2005-120464
Apr. 20, 2005 (JP) ............................. 2005-121793

(51) Int. Cl.
*G01B 7/30* (2006.01)
*H01L 43/06* (2006.01)
*G01M 17/06* (2006.01)

(52) U.S. Cl. ............................. 324/207.25; 324/207.2; 73/117.02

(58) Field of Classification Search ............ 324/207.15, 324/207.2, 207.21, 207.22, 207.25; 73/117.02
See application file for complete search history.

(56) References Cited

U.S. PATENT DOCUMENTS 3,028,092 A * 4/1962 Fay, III ....................... 708/810

(Continued)

FOREIGN PATENT DOCUMENTS

JP          7-332441        12/1995

(Continued)

OTHER PUBLICATIONS

Allgro Microsystems, Inc. brochure for A3517 and A3518 Ratiometric, Linear Hall-Effect Sensor ICs for High Temperature Operation. Dated 1997 and 2002.*

(Continued)

*Primary Examiner*—Kenneth J Whittington

(57) ABSTRACT

A multiple rotation absolute angle detecting device includes a reduction gear mechanism having an eccentric ring fitted to a rotatable member, an internally threaded member in a stationary member, an externally threaded member engageable with the internally threaded member, and a speed reducing member to which rotation is transmitted from the externally threaded member. The externally threaded member undergoes a speed-reduced rotation at a reduction gear ratio of 1/L (L represents an arbitrarily value exceeding 1) about an axis O' of rotation of the eccentric ring and the speed reducing member rotates around the rotatable member at a speed equal to that of the externally threaded member. A multiple rotation detecting unit for outputting a sinusoidal or sawtooth wave having one period per rotation includes a to-be-detected member in the speed reducing member and a detecting member in the stationary member that confronts the to-be-detected member.

28 Claims, 14 Drawing Sheets

U.S. PATENT DOCUMENTS

| | | | | |
|---|---|---|---|---|
| 3,194,990 | A | * | 7/1965 | Kendall ........................ 310/10 |
| 3,530,345 | A | * | 9/1970 | Braaten et al. .............. 318/654 |
| 4,742,883 | A | * | 5/1988 | Duffy ........................ 180/428 |
| 5,697,868 | A | | 12/1997 | Akeel |
| 6,323,643 | B1 | * | 11/2001 | Kordecki ................. 324/207.2 |
| 6,396,259 | B1 | * | 5/2002 | Washeleski et al. .... 324/207.22 |
| 7,307,415 | B2 | * | 12/2007 | Seger et al. .............. 324/207.2 |
| 2001/0009366 | A1 | * | 7/2001 | Kono et al. .............. 324/207.2 |
| 2005/0022617 | A1 | * | 2/2005 | Sano ........................ 73/865.9 |
| 2005/0022785 | A1 | | 2/2005 | Kurita et al. |

FOREIGN PATENT DOCUMENTS

| | | |
|---|---|---|
| JP | 8-5310 | 1/1996 |
| JP | 9-218055 | 8/1997 |
| JP | 2001-289671 | 10/2001 |
| JP | 2002-125345 | 4/2002 |
| JP | 2002-166836 | 6/2002 |
| JP | 2002-340545 | 11/2002 |
| JP | 2003-344009 | 12/2003 |
| JP | 2004-4028 | 1/2004 |
| JP | 2004-45083 | 2/2004 |
| JP | 2004-308724 | 11/2004 |
| JP | 2005-48671 | 2/2005 |

OTHER PUBLICATIONS

International Search Report (PCT/ISA/210) of the International Application No. PCT/JP2006/307576 (mailed on Jun. 13, 2006).

International Preliminary Report on Patentability issued in corresponding International Patent Application No. PCT/JP2006/307576, mailed on Nov. 1, 2007.

* cited by examiner

DEVICE FOR DETECTING ABSOLUTE ANGLE OF MULTIPLE ROTATION AND ANGLE DETECTION METHOD

BACKGROUND OF THE INVENTION

1. Field of the Invention

The present invention relates to a device for detecting the absolute angle of multiple rotations such as, for example, the absolute steering angle of steering, to a bearing assembly equipped with such an absolute angle detecting device and to a method of detecting the angle thereof.

2. Description of the Prior Art

The above-mentioned type of multiple rotation absolute angle detecting device has been suggested in the art, in which using a reduction gear mechanism made up of a combination of a worm and a worm wheel or a reduction gear mechanism utilizing a set of spur gears, output signals outputted respectively from an encoder for detecting an absolute angle within one complete rotation and an encoder for detecting multiple rotation are synthesized by a signal processing circuit to thereby detect the absolute angle of multiple rotations. (See, for example, the Japanese Laid-open Patent Publications No. 2001-289671 published Oct. 19, 2001 and No. 2004-45083 published Feb. 12, 2004.)

As a device for use in detecting the steering angle of a steering wheel, a device for detecting the rotation angle of a steering shaft has also been suggested, in which while a large diameter gear is employed in coaxial relation with the steering shaft, in combination with a reduced diameter gear drivingly engaged with the large diameter gear, the rotation angle of the steering shaft can be determined based on an output signal from a reference position sensor for detecting magnets, mounted on an outer peripheral portion of the large diameter gear in 90° spaced relation to each other, and an output signal from a magnetic sensor for detecting lines of magnetic force emanating from a rotation angle detecting magnet mounted on the reduced diameter gear. (See, for example, the Japanese Laid-open Patent Publication No. 2003-344009 published Dec. 3, 2003.)

Furthermore, a multiple rotation absolute angle detecting device of a structure, which is so designed as to detect the absolute angle of multiple rotations of a to-be-measured member, which is coupled direct with an input shaft of a planetary gear mechanism, through detection of rotation of an output shaft of the planetary gear mechanism. (See, for example, the Japanese Laid-open Patent Publication No. 2002-340545 published Nov. 27, 2002.)

Yet, as a mechanism for detecting the rotation angle as an absolute angle, the device has been suggested in the art, which includes a to-be-detected member fitted to a rotatable raceway member of a bearing assembly and having a magnetic characteristic varying, with one complete rotation taken as one cycle, and a magnetic sensor fitted to a stationary raceway member of the bearing assembly in face-to-face relation with the to-be-detected member and which is so designed as to detect the absolute rotation angle without any initialization being carried out at the time the device is electrically powered on. (See, for example, the Japanese Laid-open Patent Publication No. 2004-4028 published Jan. 8, 2004.)

As a mechanism for detecting the absolute angle of multiple rotations, the device has been suggested in the art, which includes a to-be-detected member fitted to a retainer of a bearing assembly and having a magnetic characteristic cyclically varying, with one complete rotation taken as one cycle, and a magnetic sensor fitted to a stationary raceway member of the bearing assembly in face-to-face relation with the to-be-detected member and which is so designed as to detect the absolute rotation angle of the rotatable raceway member over multiple rotations, taking advantage of a reduced rotational speed of the retainer relative to the rotatable raceway member. (See, for example, the Japanese Laid-open Patent Publication No. 2004-308724 published Nov. 4, 2004.)

However, the device, in which the reduction gear mechanism including a combination of the worm and the worm wheel such as disclosed in the Japanese Laid-open Patent Publication No. 2001-289671 referred to above, has a problem in what although a relatively large reduction gear ratio can be enjoyed, not only is the structure complicated because of the shafts lying perpendicular to each other, but a relatively large space is required.

Also, the device, which utilizes the reduction gear mechanism including the spur gears such as disclosed in the Japanese Laid-open Patent Publications No. 2004-45083 and No. 2003-344009 referred to above, requires a relatively large space in a radial direction of the mechanism for accommodating the sensor. Moreover, since it makes use of a plurality of shafts, a relatively large space is required for installation of the bearing assembly, resulting in complicating of the structure.

According to the structure, which utilizes the planetary gear mechanism such as disclosed in the Japanese Laid-open Patent Publication No. 2002-340545 referred to above, a problem has been found as to how the gears (particularly, planetary gears) are to be supported as well as the increased number of the gears employed. Additionally, an attempt to increase the reduction gear ratio tends to result in increase of the dimensions in a direction radially of the mechanism.

Further, the multiple rotation absolute angle detecting device utilizing the various reduction gear devices discussed above is capable of detecting only the number of rotations corresponding to the reduction gear ratio (for example, only five complete rotations where the reduction gear ratio is 1/5).

Furthermore, the device disclosed in the Japanese Laid-open Patent Publication No. 2004-4028 referred to above is capable of detecting only the absolute angle within one complete rotation.

Also, the device disclosed in the Japanese Laid-open Patent Publication No. 2004-308724 referred to above, in which the to-be-detected member is fitted to the retainer, is incapable of accurately detecting the absolute angle since during the rotation or the halt and start of rotation, rolling members often tend to undergo slippage.

SUMMARY OF THE INVENTION

In view of the foregoing, objects of the present invention are to provide a multiple rotation absolute angle detecting device capable of contributing to downsizing of the detecting device and also capable of detecting the absolute angle of multiple rotations over a wide range, to provide a bearing assembly equipped with the multiple rotation absolute angle detecting device, and to provide a detecting method performed by the use of such a multiple rotation absolute angle detecting device.

The multiple rotation absolute angle detecting device of the present invention includes a reduction gear mechanism made up of an eccentric ring fitted to a rotatable member; an internally threaded member arranged in a stationary member and having inwardly oriented teeth; an externally threaded member having outwardly oriented teeth and capable of undergoing a speed-reduced rotation at a reduction gear ratio of 1/L (wherein L represents an arbitrarily chosen number exceeding 1) about an axis of eccentric rotation of the eccentric ring when meshed with the internally threaded member; and a speed reducing member driven by the externally threaded member to undergo a speed-reduced rotation at the reduction gear ratio of 1/L around the rotatable member at a speed equal to that of rotation of the externally threaded member on the axis of eccentric rotation; as well as a multiple rotation detecting unit capable of outputting a sinusoidal or sawtooth wave having one period during each complete rotation made up of a to-be-detected member provided in the speed reducing member; and a detecting member arranged in the stationary member so as to confront the to-be-detected member.

According to this construction, the reduction gear mechanism of a high reduction gear ratio can be constructed with a inscribed planetary gear mechanism, which includes the eccentric ring, the internally threaded member and the externally threaded member, and a uniform speed internal gear mechanism which includes the externally threaded member and the speed reducing member. Because of this, by detecting the absolute position of the speed reducing member of the reduction gear mechanism, the wide range of multi-rotation angles can be detected. Also, by using the inscribed planetary gear mechanism and the uniform speed internal gear mechanism for the reduction gear mechanism, the multiple rotation absolute angle detecting device of a through-shaft type can be constructed. In view of these, a high reduction gear ratio can be obtained with the reduction gear mechanism of the through-shaft type and, therefore, the wide range of multi-rotation angles can be detected with a compact structure. Where the rotatable member referred to above is a rotary shaft, for example, a rotatable raceway member of a bearing assembly including a rotary shaft, it can be largely applied to various machines and equipments of a kind including a bearing assembly.

In the present invention, the to-be-detected member referred to above may include a magnetic encoder, in which case the detecting member comprises a sensor housing having a Hall IC incorporated therein. By so doing, the multiple rotation absolute angle detecting device can be simplified in structure.

In the present invention, the sensor housing referred to above may be molded together with the Hall IC with a resinous material. In this case, the handling capability can be increased.

Also, the to-be-detected member may include a rotor of a resolver, in which case, the detecting member includes a stator of the resolver. The use of the resolver permits a highly accurate detection.

Also, the internally threaded member may be an internal gear and the externally threaded member may be a spur gear. In this case, the structure can be simplified.

In the present invention, the multiple rotation absolute angle detecting device may further include engagements provided in the speed reducing member and the stationary member, or a component part fitted to the stationary member, respectively, for defining the range of rotation of the speed reducing member in abutment therewith. The use of the engagements is effective to limit the rotation of the speed reducing member within a range of one complete rotation which the multiple rotation detecting unit can detect the absolute angle.

In the present invention, the multiple rotation absolute angle detecting device may further include a correcting section for modifying a signal, outputted from the multiple detecting unit, to an ideal waveform. The use of the correcting section is effective to accomplish a highly accurate angle detection even through the output characteristic of the multiple rotation detecting unit does not provide a smooth sawtooth or sinusoidal wave. The correcting section referred to may be that effective to electrically correct.

In the present invention, the multiple rotation absolute angle detecting device may further include a single rotation detecting mechanism having a single rotation detecting unit, which is a rotation detector for outputting a sinusoidal or sawtooth wave having n periods (n being a natural number) during each complete rotation and includes a to-be-detected member provided in the rotatable member and a detecting member disposed in the stationary member so as to confront the to-be-detected member.

In the case of this construction, the output signal of the multiple detecting unit can be used to determine the number of rotation of the rotatable raceway member and, by utilizing the number of rotation determined and the output signal of the single rotation detecting unit, a highly accurate multiple rotation absolute angle can be detected.

In this case, the to-be-detected member of the single rotation detecting mechanism may be constituted by a magnetic encoder and the detecting member of the single rotation detecting mechanism may also be constituted by a sensor housing having a Hall IC incorporated therein. By so designing, the single rotation detecting unit can be simplified in structure.

In the present invention, the to-be-detected member of each of the single rotation detecting unit and the multiple rotation detecting unit may be constituted by a magnetic encoder and the detecting member of each of the single rotation detecting unit and the multiple rotation detecting unit may also be constituted by a sensor housing having a Hall IC incorporated therein, and the respective sensor housings of the single rotation detecting unit and the multiple rotation detecting unit may be formed integrally with each other. In the case of this construction, the detecting units can be downsized in structure. Also, the sensor housing may be molded together with the Hall IC of each of the detecting members by means of a resinous material. In this multiple rotation absolute angle detecting device, the to-be-detected member of the single rotation detecting unit may be constituted by a rotor of a resolver, in which case the detecting member of the multiple rotation detecting unit is constituted by a stator of the resolver.

In the present invention, the single rotation detecting unit may be of a type operable to output a sinusoidal or sawtooth wave having n periods (n being a natural number) during each complete rotation of the rotatable member for detecting the absolute angle of the rotatable member and the multiple rotation detecting unit may also be operable to output a sinusoidal or sawtooth wave having one period during each complete rotation of the speed reducing member for detecting the absolute angle of the reduction gear mechanism output unit. In this multiple rotation absolute angle detecting device, the value of L in the gear reduction ratio of 1/L of the reduction gear mechanism is chosen to be a non-integer and there is also provided a rotational direction determining section for performing a determination of the positive or negative with respect to the original position of the rotatable member with the use of a boundary value calculated from the value of the output signal of the multiple rotation detecting unit according to a predetermined calculating standard, a rotation number calculating section for calculating the absolute value of the number of rotation based on a result of determination of the positive or negative of the rotational direction by means of the rotational direction determining section and the number of rotations determined from the detected value of the multiple rotation detecting unit, and a multiple rotation absolute angle calculating section for calculating the absolute rotation angle within the ±L rotations from the original position of the rotatable member, in reference to the absolute value of the number of rotations calculated by the rotation number calculating section and the value of the output of the single rotation detecting unit.

When the angle detecting device is so constructed as hereinabove described, the rotation angle detecting range can be increased to achieve downsizing of the device with no need to increase the reduction gear ratio of the reduction gear mechanism.

The rotational direction determining section referred to above may be operable to determine the boundary value on a boundary value curve from the output signal of the multiple rotation detecting unit, while the boundary value curve corresponding to the output waveforms with a displaced phase between the output waveforms during the rotation of the single detecting unit in the positive and negative directions, respectively, is defined, and then compare the boundary value with the value of the output signal of the single rotation detecting unit to thereby determine the positive or negative direction of rotation with reference to the predetermined standard.

As described above, the use of the boundary value to determine the positive or negative is effective to achieve a highly accurate detection by means of a simplified calculation.

In the present invention, the multi-rotation angle detecting device may be used as a steering sensor of a steering.

Since the steering sensor of a steering requires the absolute angle of ± several rotations to be achieved, such an effect of the present invention, in which a wide range of detection of the multiple rotation absolute angle is possible with a compact construction of the present invention, can be exhibited effectively.

Also, the bearing assembly according to the present invention may be of a type including a rotatable raceway ring, a stationary raceway ring, rolling elements, and the multiple rotation absolute angle detecting device of the present invention, and operable to support a rotary shaft. In this case, the rotatable member is the rotatable raceway ring of the bearing assembly and the stationary member is the stationary ring member of the bearing assembly.

In the bearing assembly of the present invention, the bearing assembly may further include a single rotation detecting mechanism of the type described above, and the multiple rotation absolute angle detecting mechanism and the single rotation detecting mechanism are fitted between two rolling bearing units comprising a rotatable raceway ring, a stationary raceway ring and rolling elements. Positioning those mechanisms between the two rolling bearings is effective to avoid a misalignment of an axis therebetween and also to enhance detection of the absolute angle of multiple rotations with high precision.

Also, a mechanism for applying a preload to the two rolling bearing units may be employed. With the preload applied, the bearing rigidity can be increased and a further highly accurate detection of rotation is possible.

The mechanism for applying the preload may permit the stationary raceway member of at least one of the two rolling bearing units to be axially movable relative to a stationary side of the single rotation detecting mechanism and the multiple rotation absolute angle detecting mechanism.

In the present invention, the multiple rotation absolute angle detecting mechanism may be fitted to one of the rolling bearing units, in which case the single rotation detecting mechanism is fitted to the other of the rolling bearing unit, and the single rotation detecting mechanism and the multiple rotation absolute angle detecting mechanism may then be connected together. This construction is effective to increase the assemblability of the absolute multi-rotational detecting mechanism.

Also, a connection of the stationary raceway ring may be constituted by a detecting unit for the single rotation detection or a detecting unit for the multiple rotation detection. In the case of this construction, there is no need to use any separate and additional member as a connection and, therefore, the connection can be simplified.

A multiple rotation absolute angle detection method utilizing the multiple rotation absolute angle detecting device of the present invention is such that assuming that the number of periods of the sinusoidal wave or sawtooth wave outputted from the single rotation detecting unit is expressed by n (which is a natural number), the decimal portion α of L in the reduction gear ratio 1/L is selected to be such as expressed by the following formula:

$$\alpha \neq \beta/n \ (0 \leq \beta \leq 0 \leq n-1, \text{ where } \beta \text{ is an integer})$$

By setting the reduction gear ratio of 1/L of the reduction gear mechanism for the detection of the multiple rotations to be a value appropriate to the number of periods n of the sinusoidal or sawtooth wave outputted from the rotation angle detecting device of the single rotation detecting unit, determination of the rotation in the positive direction and that in the negative direction can be achieved. Therefore, it is possible to detect up to the number of rotation that is twice the reduction gear ratio. By way of example, where the reduction gear ratio is 1/5, detection up to ten rotations can be accomplished.

By setting the decimal portion α of the value of L in the reduction gear unit to be α≠β/n (wherein 0≦β≦n-1 and β is an integer), the multiple rotation absolute angle can be achieved over the range of ±L rotations.

Since the detecting range is increased by means of the determination of whether the rotation is taking place in the positive direction or whether it is in the negative direction, there is no need to increase the reduction gear ratio of the reduction gear mechanism itself and, therefore, with a compact structure, the wide range of detection of the multiple rotation absolute angle can be accomplished.

Another multiple rotation absolute angle detection method of the present invention is a multiple rotation absolute angle detection method utilizing the multiple rotation absolute angle detecting device designed in accordance with the present invention, in which assuming that L of the reduction gear ratio of 1/L is a non-integer, the range of rotations to be detected is ±r (where r represents an integer), and the number of periods of the sinusoidal or sawtooth wave outputted from the single rotation detecting unit of the single rotation detecting mechanism is expressed by n (where n is an integer), the value L is expressed by the following formula:

$$L = r + 1/(2n)$$

When the value of L of the reduction gear ratio of 1/L is chosen to be L=r+1/(2n), the phase difference between the signal indicative of the positive rotation and the signal indicative of the negative rotation in the single rotation detecting unit becomes maximized and the signal from the multiple rotation detecting unit can be utilized at maximum. For this reason, determination of the rotational direction and the number of rotation can be facilitated and, even though any play exists in the reduction gear mechanism and/or the signal contains noises, the multiple rotation absolute angle can be detected with high precision.

A further multiple rotation absolute angle detection method of the present invention is a detecting method utilizing the multiple rotation absolute angle detecting device of the present invention, in which assuming that L of the reduction gear ratio of 1/L is a non-integer, the range of rotations to be detected is ±r (where r represents an integer), and the number of periods of the sinusoidal or sawtooth wave outputted from the single rotation detecting unit of the single rotation detecting mechanism is expressed by n (where n is an integer), the decimal portion in the value of L of the reduction gear ratio of 1/L is expressed by the following formula:

a/n+1/(2n) (wherein 0≦a<n and a is an integer)

When as described above the decimal portion in the value of L of the reduction gear ration of 1/L is chosen to be a/n+1/(2n), the phase difference between the signal indicative of the positive rotation and the signal indicative of the negative rotation in the single rotation detecting unit becomes maximized and the signal from the multiple rotation detecting unit can be utilized at maximum. For this reason, determination of the rotational direction and the number of rotation can be facilitated and, even though any play exists in the reduction gear mechanism and/or the signal contains noises, the multiple rotation absolute angle can be detected with high precision.

Also, a further multiple rotation absolute angle detection method of the present invention utilizing the multiple rotation absolute angle detecting device of the present invention includes, assuming that the value L of the gear reduction ratio of 1/L of the reduction gear mechanism is a non-integer, a step of determining the positive or negative relative to the original position of the rotatable member with the use of a boundary value calculated from the value of the output signal of the multiple rotation detecting unit according to a predetermined calculating standards, and a step of calculating an absolute rotation angle within ±L rotations from the original position of the rotatable member from the number of rotations determined from the output signal of the multiple rotation detecting unit, a result of determination of the positive or negative and the output signal detected by the single rotation detecting unit.

According to the above described method, since the value of L in the reduction gear ratio of 1/L of the reduction gear mechanism is chosen to be a non-integer, that is, since the value of L is defined to a halfway value, even through one value of the output signals of the multiple rotation detecting unit, corresponds to both of the rotations in the positive and negative directions, the values of the output signals of the single rotation detecting unit differ from each other. Because of this, the positive or negative can be determined. This determination of the positive or negative is carried out by the use of the boundary value that is calculated based on a predetermined calculating standard from the detected value of the multiple detecting unit. The use of the boundary value is effective to facilitate a highly accurate determination of the positive or negative with a simplified calculation.

Since the determination of the positive or negative is possible as hereinabove described, the range of the rotation angle detection can increase. Where the reduction gear ratio of 1/L is set to a proper value, the rotation angle detecting range can be rendered to be the number of rotation that is about twice the reduction gear ratio. Also, since there is no need to increase the reduction gear ratio of the reduction gear mechanism, the multiple rotation absolute angle detecting device of a compact structure can be realized.

The step of determining the positive or negative may be carried out by determining the boundary value on the boundary value curve from the output signal of the multiple rotation detecting unit, while the boundary value curve corresponding to the output waveforms with a displaced phase between the output waveforms during the rotation of the single detecting unit in the positive and negative directions, respectively is defined, and comparing the boundary value with the value of the output signal of the single rotation detecting unit to thereby determine the positive or negative direction of rotation with reference to the predetermined standard.

The single rotation detecting unit and the multiple rotation detecting unit outputs a sawtooth wave and wherein the single rotation detecting unit and the multiple rotation detecting unit output respective sawtooth waves and during the step of determining the positive or negative, the boundary value curve is a curve, in which the output waveform of the single rotation detecting unit is displaced to a point intermediate between the phases during the rotation in the positive direction and that in the negative direction, and the determination of the positive or negative is carried out by taking a difference between the boundary value in the rotation angle, obtained from the output signal of the multiple rotation detecting unit, and the output signal of the single rotation detecting unit, and comparing a combination of a result of determination of the positive and negative of the difference and a result of determination of the magnitude of the difference relative to a predetermined value with a predetermined determining condition to thereby accomplish the determination of the positive or negative.

As hereinabove described, when the boundary value curve LB is set to a line intermediate between the phase during the rotation in the positive direction and the phase during the rotation in the negative direction, a tolerance for any error and/or noises can have a large latitude, allowing a highly reliable determination of the positive or negative. Also, by setting the determining condition, calculation of the determination of the positive or negative can be accomplished easily. It is to be noted that even where the single rotation detecting unit and the multiple rotation detecting unit output a sinusoidal wave, it is preferred that signals a and b of sinusoidal waveforms displaced 90° relative to each other, which exhibit one cycle for each complete rotation (wherein "a" represents a sinusoidal wave and "b" represents a cosine wave), are detected from the two Hall ICs arranged in 90° phase difference relation to each other, and, after the sawtooth wave is prepared by calculating the absolute angle of each complete rotation by means of a quadrant determination of each output of a/b while the half value Vc/2 of the power source voltage Vc is set to zero, the boundary value curve is set to lie intermediate between the phase during the rotation in the positive direction and the phase during the rotation in the negative direction as described above, and the determination of the positive or negative is carried out by setting the determining conditions as described above.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

Figure 1:
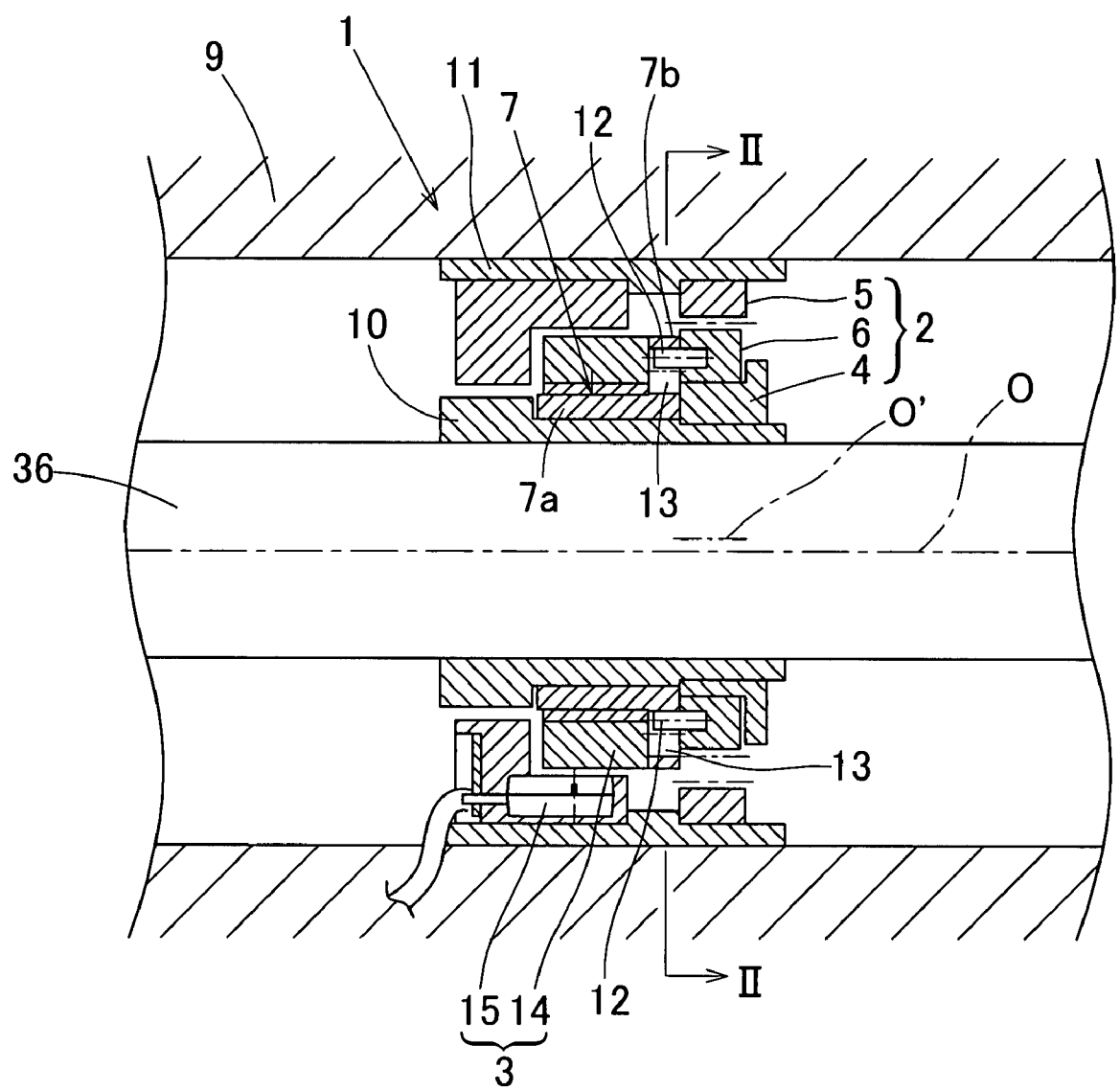
FIG. 1 is a sectional view of a multiple rotation absolute angle detecting device according to a first preferred embodiment of the present invention.

A first preferred embodiment of the present invention will be described hereinafter with particular reference to FIGS. 1 to 3. The illustrated multiple rotation absolute angle detecting device 1 is of a type utilized, for example, as a steering angle sensor for detecting the rotation angle of a steering wheel and includes a reduction gear mechanism 2 for converting a rotation of a rotary shaft 36, which is a rotatable member, into a speed-reduced rotation, and a multiple rotation detecting unit 3 for detecting the speed-reduced rotation which has been converted by the reduction gear mechanism 2. The rotary shaft 36 referred to above is rotatably supported through a bearing assembly (not shown) by a stationary member in the form of a casing 9.

The reduction gear mechanism 2 includes an eccentric ring 4 fixed to the rotary shaft 36, an internally threaded member 5 deployed on an inner periphery side of the casing (stationary member) 9 in coaxial relation with the rotary shaft 36, an externally threaded member 6 engageable with the internally threaded member 5 for rotation about an axis O' of eccentric rotation of the eccentric ring 4, and a speed reducing member 7. The speed reducing member 7 is rotatably mounted on an outer periphery of the rotary shaft 36 and is driven by the externally threaded member 6 so as to rotate at a speed equal to that of the externally threaded member 6.

The outer periphery of the rotary shaft 36 is mounted with a cylindrical rotor housing 10 by means of press-fitting or bond and an outer periphery of the rotor housing 10 is mounted with the eccentric ring 4 by means of press-fitting or bond. The eccentric ring 4 has an outer peripheral surface which is in an eccentric relation with an inner peripheral surface thereof, into which the rotor housing 10 is fitted. Accordingly, the axis O' of eccentric rotation, which contains a center of the outer peripheral circle of the eccentric ring 4, is held eccentric relative to the longitudinal axis O of the rotary shaft 36. Thus, it will readily be seen that the eccentric ring 4 has its outer peripheral surface undergoing an eccentric rotation when it rotates together with the rotary shaft 36.

The externally threaded member 6 is in the form of a spur gear having outwardly oriented teeth and is rotatably mounted on the outer peripheral surface of the eccentric ring 4 for rotation about the axis O' of eccentric rotation. Although not shown in FIG. 1, in order to render the externally threaded member 6 to be rotatable, the externally threaded member 6 is preferably mounted on the eccentric ring 4 through a bearing assembly. By using a sliding bearing for the bearing assembly in that case, the structure necessary for the externally threaded member 6 to be mounted on the eccentric ring 4 can be further downsized.

An inner periphery of the stationary member 9 is mounted with a cylindrical stator housing 11 by means of press-fitting or bond, and an inner periphery of the stator housing 11 is mounted with the internally threaded member 5 referred to above by means of press-fitting or bond. The internally threaded member 5 is in the form of an internal gear having radially inwardly oriented teeth. It is to be noted that securement of the stator housing 11 to the inner periphery of the stationary member 9 and securement of the rotor housing 10 to the outer periphery of the rotary shaft 36 may be accomplished by means of bolts, in which case steps for axially positioning the stator housing 11 and the rotor housing 10 are formed in the inner periphery of the stationary member 9 and the outer periphery of the rotary shaft 36, respectively.

With the radially outwardly oriented teeth of the externally threaded member 6 engaged with the radially inwardly oriented teeth of the internally threaded member 5, the externally threaded member 6 undergoes a speed-reduced rotation about the axis O' of eccentric rotation in a direction counter to the direction of rotation of the rotary shaft 36 at a reduction gear ratio of 1/L (wherein L represents an arbitrarily chosen value in excess of 1). The relation between the internally threaded member 5 and the externally threaded member 6 in this case is well known in the art and forms an inscribed planetary gear mechanism. Assuming that the number of the teeth of the externally threaded member 6 is $Z_1$ and the number of the teeth of the internally threaded member 5 is expressed by $Z_2$, the reduction gear ratio is represented by $(Z_2-Z_1)/Z_1$. It is to be noted that although in the instance now under discussion, the externally threaded member 6 and the internally threaded member 5, having a small difference in number of the teeth provided therein, are meshed with each other to achieve a speed reduction, the internally threaded member 5 and the externally threaded member 6 may have any suitable tooth shape provided that their teeth can engage with each other.

The externally threaded member 6 has a side face provided with a plurality of axially protruding engagement pins 12 that are spaced an equal distance from each other in a direction circumferentially thereof.

The speed reducing member 7 referred to above is an annular member that is rotatably mounted on the outer periphery of the rotor housing 10 and is made up of a cylindrical portion 7a mounted on the outer periphery of the rotor housing 10, and a flange portion extending from one end of the cylindrical portion 7a in a direction radially outwardly. The speed reducing member 7 is positioned adjacent the eccentric ring 4 in such a manner as to allow the flange portion 7b to axially confront the engagement pins 12 fast with the externally threaded member 6.

Figure 2:
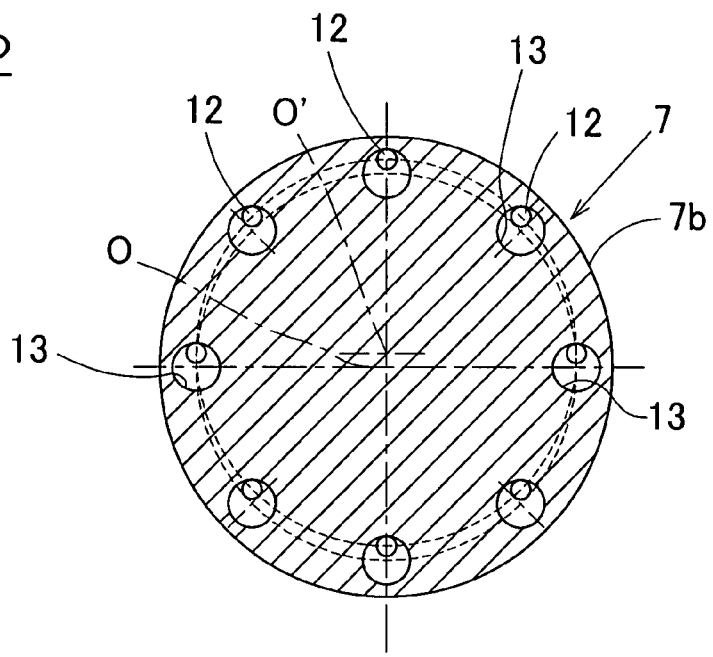
FIG. 2 is a cross-sectional view taken along the line II-II in FIG. 1.

As best shown in FIG. 2, a side face of the flange portion 7b of the speed reducing member 7, which confronts the externally threaded member 6 is formed with a plurality of guide recesses 13 for engagement with the engagement pins 12, which recesses 13 are spaced a predetermined distance from each other in a direction circumferentially thereof. Each of the guide recesses 13 is formed to represents a cylindrical hole of a sufficiently greater diameter than that of the pin diameter of the engagement pins 12 so that the engagement pins 12 that turn about the axis O' of eccentric rotation can be tolerated to displace within the guide recesses 13. With the engagement pins 12 of the externally threaded member 6 engaged in the guide recesses 13 in the speed reducing member 7, the speed reducing member 7 can rotate around the rotary shaft 36 at a speed equal to that of the rotation of the externally threaded member 6. The relation between the externally threaded member 6 and the speed reducing member 7 in this case forms a uniform speed internal gear mechanism well known to those skilled in the art. It is to be noted in this mechanism, the engagement pins 12 may be provided in the speed reducing member 7, in which case the guide recesses 13 should be formed in the externally threaded member 6. Although not shown in FIG. 1, in order to render the speed reducing member 7 rotatable, the speed reducing member 7 is preferably mounted on the rotor housing 10 through a bearing assembly. By using a sliding bearing for the bearing assembly in that case, the structure necessary for the speed reducing member 7 to be mounted on rotor housing 10 can be further downsized.

Since the externally threaded member 6 undergoes a speed-reduced rotation about the axis O' of eccentric rotation, it is difficult to directly detect the rotation angle of the externally threaded member 6. However, since because of the structure described above, rotation of the externally threaded member 6 is transmitted to the speed reducing member 7 that can rotate about the longitudinal axis O of the rotary shaft 36, detection of the rotation of the speed reducing member 7 allows the speed-reduced rotation of the externally threaded member 6 to be detected indirectly.

The multiple rotation detecting unit 3 includes a to-be-detected member 14 mounted on an outer periphery of the cylindrical portion 7a of the speed reducing member 7, and a detecting member 15 provided in an inner periphery of the stator housing 11 on the side of the stationary member 9 so as to confront the to-be-detected member 14. This multiple rotation detecting unit 3 is such that during one complete rotation of the speed reducing member 7, the detecting member 15 outputs a sinusoidal or sawtooth wave having a single period. This multiple rotation detecting unit 3 is of a structure in which the to-be-detected member 14 is comprised of, for example, a magnetic encoder and the detecting member 15 is comprised of a sensor housing accommodating therein two Hall ICs spaced 90° in phase from each other. Alternatively, it may be of a structure, in which the to-be-detected member 14 is comprised of a rotor of a resolver and the detecting member 15 is comprised of a stator of the resolver.

Figure 3:
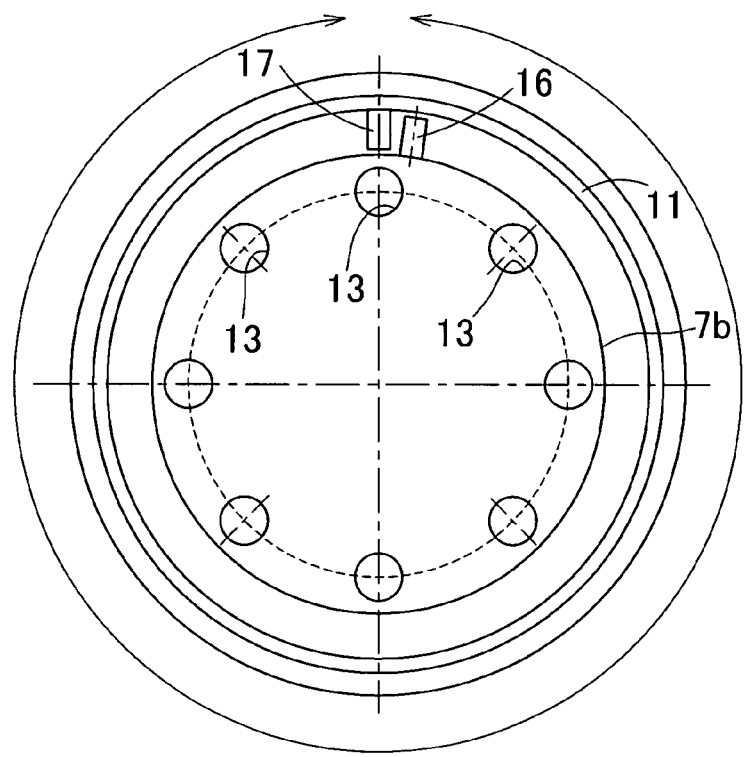
FIG. 3 is a side view of a rotational range limiting mechanism employed in the multiple rotation absolute angle detecting device according to the first preferred embodiment.

As best shown in FIG. 3, the range of rotation can be limited by providing two engagements 16 and 17 in the outer periphery of the flange portion 7b of the speed reducing member 7 and an inner periphery of the stator housing 11 that confronts the flange portion 7b in a radial direction, respectively, so that when they are engaged with each other, the rotation of the speed reducing member 7 can be limited to one complete rotation within which the absolute angle can be detected with the multiple rotation detecting unit 3.

Hereinafter, the operation of the multiple rotation absolute angle detecting device 1 of the construction described hereinabove will be described. Assuming that the rotary shaft 36 rotates, the externally threaded member 6 rotatably mounted on the outer periphery of the eccentric ring 4, then drivingly meshed with the internally threaded member 5, undergoes a speed-reduced rotation at a reduction gear ratio of 1/L in a direction counter to the direction of rotation of the rotary shaft 36. The speed-reduced rotation of the externally threaded member 6 is transmitted at an equal speed to the speed reducing member 7 rotatably mounted on the outer periphery of the rotor housing 10. The absolute angle of the speed reducing member 7 within one complete rotation thereof is detected from an output waveform of the detecting member 15 of the multiple rotation detecting unit 3. Since the rotation of the rotary shaft 36 is, after having been reduced by the reduction gear mechanism 2 at the reduction gear ratio of 1/L, converted into rotation of the speed reducing member 7, one complete rotation of the speed reducing member 7 corresponds to L rotations of the rotary shaft 36. In view of this, it is possible to detect the absolute angle attained within the L rotations of the rotary shaft 36 from the output waveform of the detecting member 15 of the multiple rotation detecting unit 3.

As described hereinabove, since in the multiple rotation absolute angle detecting device 1, the inscribed planetary gear mechanism including the eccentric ring 4, the internally threaded member 5 and the externally threaded member 6, and the uniform speed internal gear mechanism including the externally threaded member 6 and the speed reducing member 7 cooperate with each other to form the reduction gear mechanism 2 of a high reduction gear ratio, a compact shaft-through type can be constructed, a high reduction gear ratio can also be obtained, and the multiple rotation absolute angle can be detected over the wide range.

Figure 4:
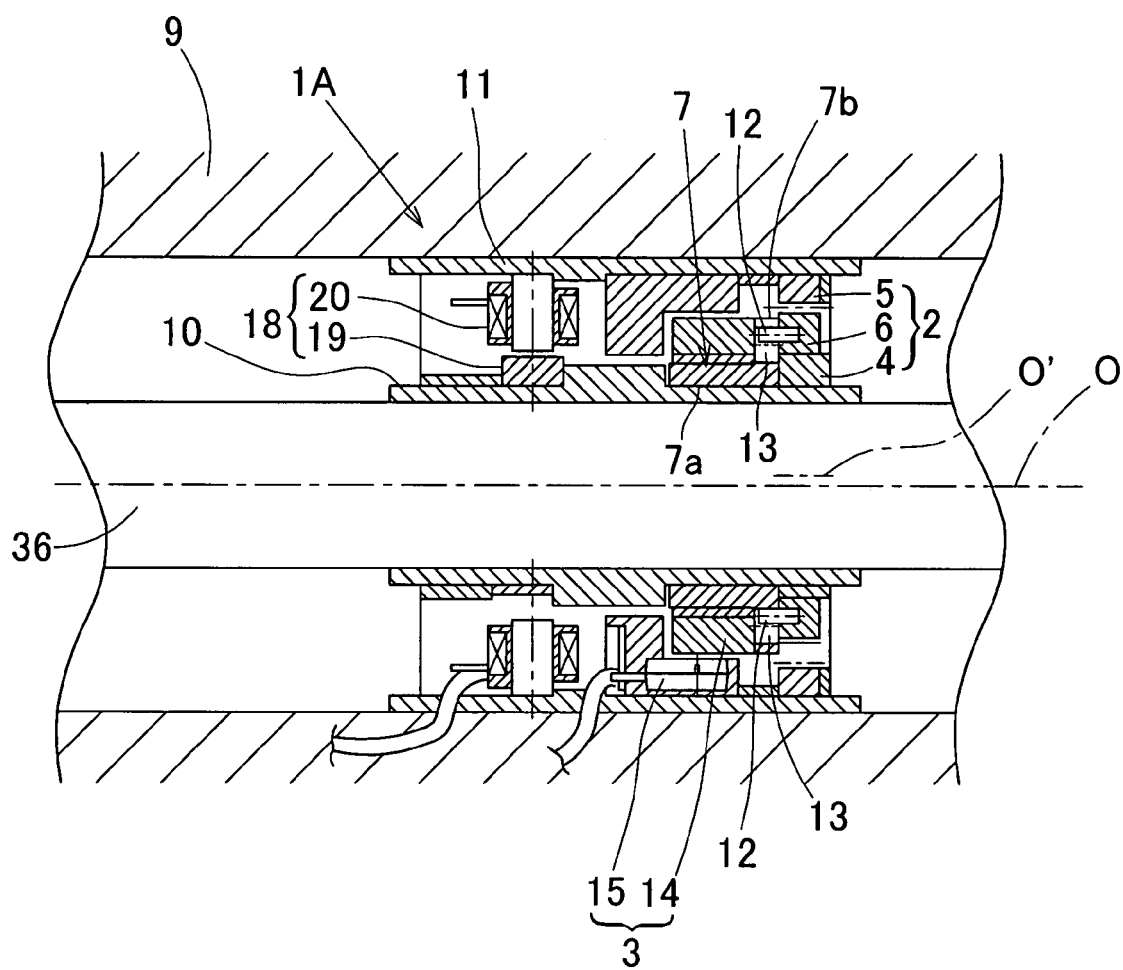
FIG. 4 is a sectional view of the multiple rotation absolute angle detecting device according to a second preferred embodiment of the present invention.

FIG. 4 illustrates a second preferred embodiment of the present invention. The multiple rotation absolute angle detecting device, now generally identified by 1A, is similar to that according to the embodiment shown in and described with particular reference to FIG. 1, except that separate from the multiple rotation detecting unit 3, a single rotation detecting unit 18 for detecting one complete rotation of the rotary shaft 36 is additionally employed. The single rotation detecting unit 18 includes a to-be-detected member 19 provided on the outer periphery of the rotor housing 10 on the side of the rotary shaft 36, and a detecting member 20 provided in the inner periphery of the stator housing 11 on the side of the stationary member 9 so as to confront the to-be-detected member 19. This single rotation detecting unit 18 is of such a structure that during one complete rotation of the rotary shaft 36, the detecting member 20 outputs a sinusoidal or sawtooth wave having n periods (wherein n=1, 2, 3, . . . ) (that is, n represents a natural number). The single rotation detecting unit 18 is of a structure in which the to-be-detected member 19 is comprised of, for example, a magnetic encoder and the detecting member 20 is comprised of a sensor housing accommodating therein two Hall ICs, spaced 90° in phase from each other. Alternatively, it may be of a structure, in which the to-be-detected member 19 may be comprised of a rotor of a resolver and the detecting member 20 may be comprised of a stator of the resolver. In the instance as shown in FIG. 4, the to-be-detected member 19 is employed in the form of the rotor of the resolver and the detecting member 20 is employed in the form of the stator of the resolver. Other structural features than those described above are similar to those shown and described in connection with the embodiment of FIG. 1.

According to the first embodiment shown in FIG. 1, since during one complete rotation of the speed reducing member 7, that is, during the L rotations of the rotary shaft 36, the detecting member 15 of the multiple rotation detecting unit 3 merely outputs a sinusoidal or sawtooth wave having one period, it cannot be expected to detect the absolute angle with high accuracy. In contrast thereto, since with the multiple rotation absolute angle detecting device 1A according to this second embodiment, the multiple rotation detecting unit 3 can determine the number of rotations of the rotary shaft 36 and the absolute rotation angle of the rotary shaft 36 can be detected by the single rotation detecting unit 18 at intervals of 1/n rotation, it is possible to accomplish the detection of the absolute angle of multiple rotations with high accuracy.

Figure 5:
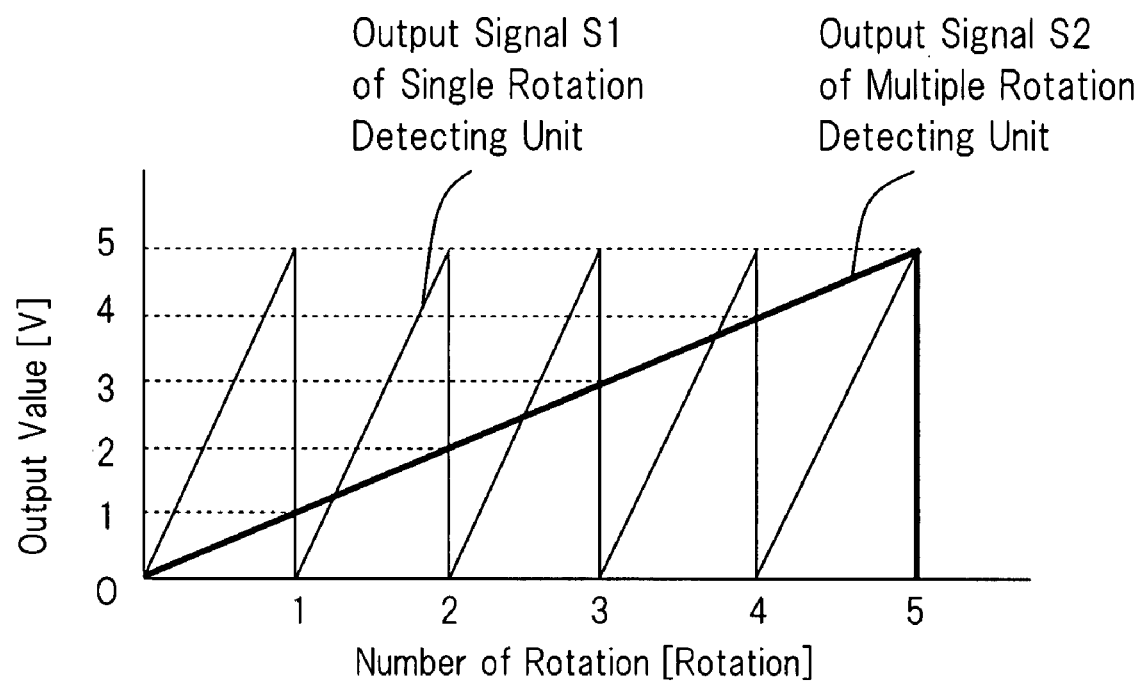
FIG. 5 is an explanatory diagram used to explain a method of detecting the absolute angle of multiple rotations with the use of the multiple rotation absolute angle detecting device according to the second preferred embodiment.

FIG. 5 is an explanatory diagram used to explain a method of detecting the absolute angle of multiple rotations with the use of the multiple rotation absolute angle detecting device 1A according to the second preferred embodiment of the present invention. In this multiple rotation absolute angle detection method, in the multiple rotation absolute angle detecting device 1A shown in and described with reference to FIG. 4, the single rotation detecting unit 18 is in the form of, for example, a resolver having an output 1X and operable to detect a sawtooth wave S1 of a single period during one complete rotation of the rotary shaft 36. The reduction gear ratio of the reduction gear mechanism 2 is set to 1/5. Similarly, the multiple rotation detecting unit 3 is in the form of a resolver having an output 1X and operable to detect a sawtooth wave S2 of a single period during one complete rotation of the speed reducing member 7. In other words, when the rotary shaft 36 undergoes five complete rotations, five sawtooth waves can be detected by the single rotation detecting unit 18 and one sawtooth wave S2 can be detected by the multiple rotation detecting unit 3. In such case, since the number of rotations of the rotary shaft 36 can be determined from an output signal S2 of the multiple rotation detecting unit 3, the absolute angle within the five complete rotations can be accurately calculated by the use of the number of rotations and the output signal S1 of the single rotation detecting unit 18.

Figure 6:
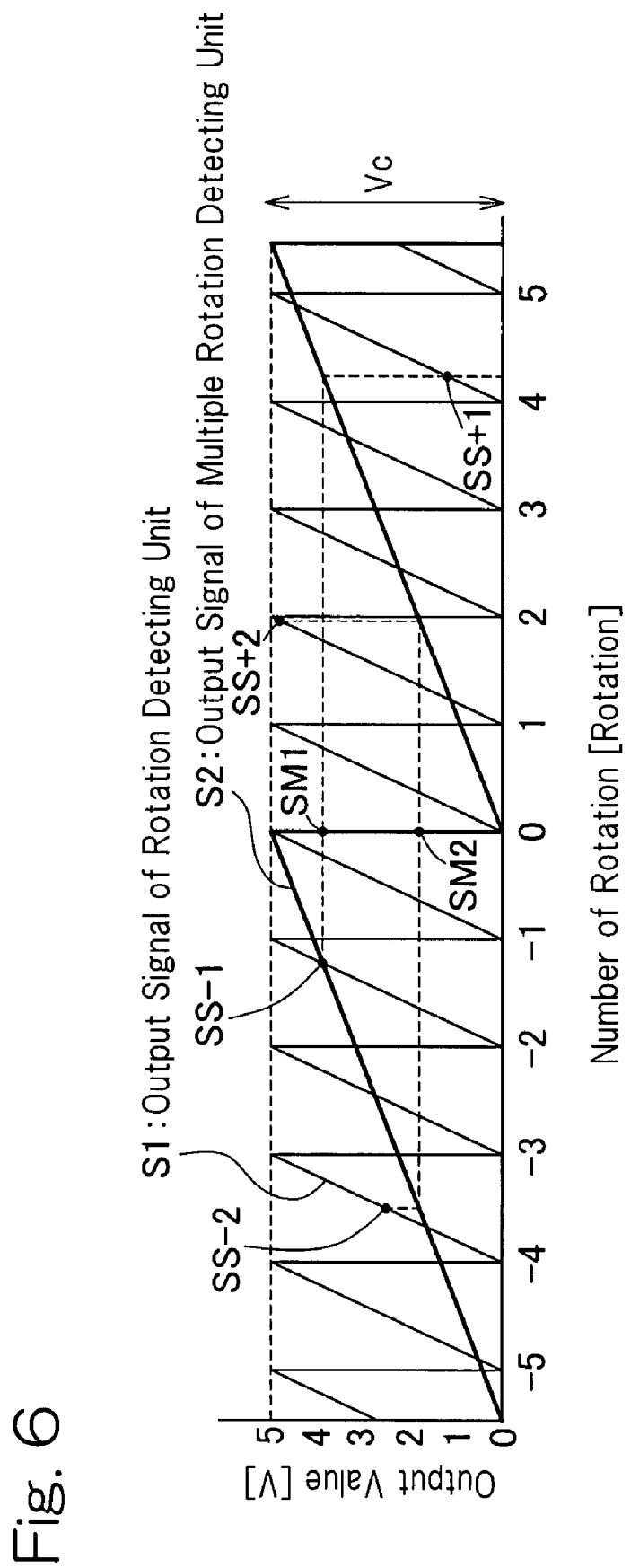
FIG. 6 is a chart showing the waveform of output signals provided by a single rotation detecting unit and a multiple rotation detecting unit, respectively, during rotations in positive and negative directions.

In the meantime, where in a manner similar to the multiple rotation absolute angle detection method shown and discussed with reference to FIG. 5, the parameter L in the reduction gear ratio 1/L of the reduction gear mechanism 2 is set to an integer such as L=5, only the absolute angle within the L rotations (L rotations in one direction of rotation) can be detected. In view of this, FIG. 6 shows an example of multiple rotation absolute angle detection method capable of detecting the absolute angle within the ±L rotations (L rotations in both of the positive and negative directions) of the rotary shaft 36 with the use of the multiple rotation absolute angle detecting device 1A according to the embodiment shown in and described with reference to FIG. 4, is shown in FIG. 6.

According to this multiple rotation absolute angle detection method, in the multiple rotation absolute angle detecting device 1A shown in FIG. 4, the single rotation detecting unit 18 is in the form of a resolver having an output 1X and operable to detect a sawtooth wave S1 of a single period during one complete rotation of the rotary shaft 36. The reduction gear ratio of the reduction gear mechanism 2 is set to 1/5.5. Similarly, the multi-rotation detecting unit 3 is in the form of a resolver having an output 1X and operable to detect a sawtooth wave S2 of a single period during one complete rotation of the speed reducing member 7. At this reduction gear ratio of 1/5.5, five complete rotations of the rotary shaft 36 results in the single rotation detecting unit 18 detecting the five sawtooth waves S1 and the multi-rotation detecting unit 3 detecting a 5/5.5 sawtooth wave S2. In such case, even though one output value S2 of the multi-rotation detecting unit 3 (for example, SM1 or SM2) corresponds to both rotations in positive and negative directions, the output value S1 of the single rotation detecting unit 18 differs depending on the direction of rotation, that is, for the rotation in the positive direction (SS+1 or SS+2) and for the rotation in the negative direction (SS−1 or SS−2). Because of this, it is possible to determine whether the rotation takes place in the positive direction or in the negative direction.

In general, assuming that the number of periods outputted from the single rotation detecting unit 18 is expressed by n (natural number), the decimal portion α of the parameter L in the reduction gear ratio 1/L of the multiple rotation detecting unit 3 may advantageously be chosen as follows:

$$\alpha \neq \beta/n \ (0 \leq \beta \leq n-1, \text{ wherein } \beta \text{ is an integer})$$

The parameter α is calculated within the range of $0 \leq \alpha \leq 1$.

In particular, in the case of the embodiment now under discussion, in which a single sawtooth wave S1 is outputted from the single rotation detecting unit 18 during one complete rotation of the rotary shaft 36, selection of the reduction gear ratio of 1/5.5 results in maximization of the difference between the output value S1 during the rotation in the positive direction and that during the rotation in the negative direction (half of the power source voltage Vc) and, therefore, determination of the positive or negative directions of rotation can be accomplished easily.

In general, by setting the parameter L in the reduction gear ratio 1/L (wherein L is a non-integer) of the reduction gear mechanism 2 as expressed by the following equation to accommodate the number n of the sawtooth waves S1 outputted from the single rotation detecting unit 18, when the ±r rotations (wherein r represents an arbitrarily chosen number)

of the rotary shaft 36 is to be detected, the difference between the output value S1 of the single rotation detecting unit 18 during the rotation in the positive direction and that during the rotation in the negative direction can be maximized and, therefore, determination of the positive or negative direction of rotation can be accomplished easily:

$$L=r+1/(2n)$$

Nevertheless, the value of the parameter in the reduction gear ratio of 1/L may be chosen to be a value greater than the number of rotations that have been actually detected and only the decimal portion of the value of the parameter L may be accommodated with the value of 1/(2n). Also, the decimal portion of the value of the parameter L may be chosen to be a/n+1/(2n) (wherein $0 \leqq a < n$ and a being an integer). Furthermore, where the number r of rotations detected is not an integer, it is recommended to satisfy the conditions hereinabove described and also to select the reduction gear ratio of 1/L so that L may be equal to or greater than r (i.e., $L \geqq r$).

Where as hereinabove described, only the decimal portion of the value of the parameter L in the reduction gear ratio of 1/L is accommodated with the value of 1/(2n), and the decimal portion of the value of the parameter L is chosen to be a/n+1/(2n), the difference in phase of a signal outputted from the single rotation detecting unit 18 during the rotation in the positive direction and that during the rotation in the negative direction attains a maximum value and a signal outputted from the multiple rotation detecting unit can also be utilized to the fullest extent. Because of this, determination of the direction of rotation and the number of rotations can be facilitated and, therefore, even in the presence of a play in the reduction gear mechanism or noises in the signals, the multiple rotation absolute angle can be accomplished with high accuracy.

When such a system is employed, the final accuracy of the absolute angle of multiple rotations becomes substantially equal to that of the output of the single rotation detecting unit 18. By way of example, in the case where the resolver is employed for the single rotation detecting unit 18, it is generally said that the accuracy of the angle calculation increases with increase of the number of periods of the output waveform S1. It is to be noted that where the number n of the periods of the output waveform S1 is assumed to be greater than 1, i.e., n>1, it is necessary to determine which one of the periods the output waveform S1 of the single rotation detecting unit 18 corresponds to, other than the determination of the numbers of rotation in the positive and negative directions, and the accuracy of the multiple rotation detecting unit 3 is also required.

In the foregoing description, the single rotation detecting unit 18 has been shown and described as employed in the form of a device which can output the detection signal of the sawtooth wave (for example, the resolver). However, for the detecting member 20 of the single rotation detecting unit 18 may include two Hall ICs arranged in 90° phase difference relation to each other in order to detect signals a and b of sinusoidal waveforms displaced 90° relative to each other, which exhibits one cycle for each complete rotation (wherein a represents a sinusoidal wave and b represents a cosine wave), for calculating the absolute angle within one complete rotation by means of a quadrant determination of a/b and each output with the half value Vc/2 of the power source voltage Vc set to zero.

Also, in the previously detecting method, the signal outputted from the multiple rotation detecting unit 3 and/or the single rotation detecting unit 18 may be electrically corrected with the use of a correction table. In order to accomplish this correction, a correcting section is provided for modifying the signal, outputted from the multiple rotation detecting unit 3 and/or the single rotation detecting unit 18, to an ideal waveform. Specifically, in the case where the output waveform is distorted because of the output characteristic of the multiple rotation detecting unit 3 and/or the single rotation detecting unit 18, the correction is carried out using data in the correction table necessary to modify to an ideal waveform of the sawtooth or cosine wave. In such case, the absolute angle detecting accuracy can be further increased.

Figure 7:
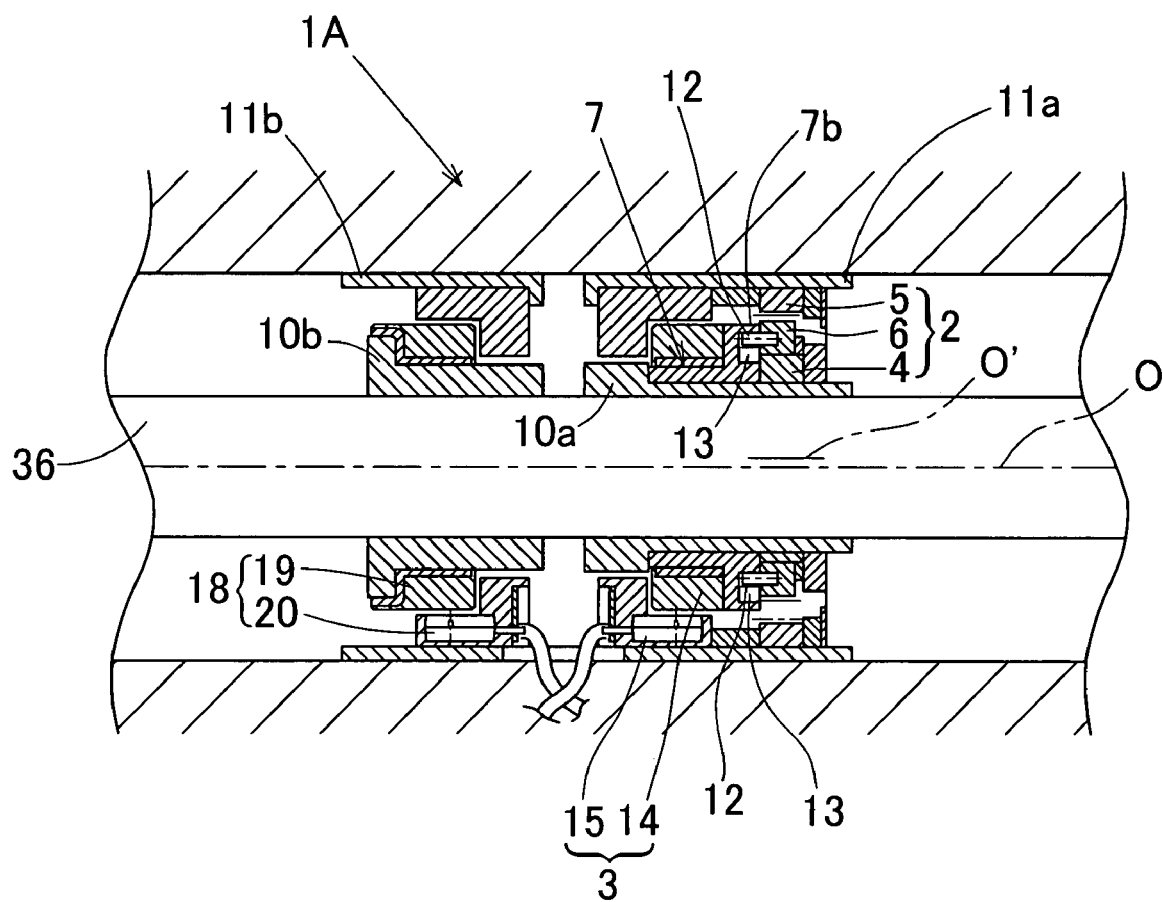
FIG. 7 is a sectional view of the multiple rotation absolute angle detecting device according to a third preferred embodiment of the present invention.

FIG. 7 illustrates a third preferred embodiment of the present invention. The multiple rotation absolute angle detecting device 1A according to this embodiment is similar to that according to the second embodiment shown in and described with reference to FIG. 4, but differs therefrom in that the single rotation detecting unit 18 in this third embodiment includes a to-be-detected member 19 in the form of a magnetic encoder, and a detecting member 20 in the form of a sensor housing, in which Hall ICs are arranged in 90° phase difference relation with each other. Also, in this embodiment, the multiple rotation detecting unit 3 similarly includes a to-be-detected member 14 in the form of a magnetic encoder, and a detecting member 15 in the form of a sensor housing, in which Hall ICs are arranged in 90° phase difference relation with each other. Moreover, the rotor housing 10 and the stator housing 11 are separated from each other in each of the multiple rotation detecting unit 3 and the single rotation detecting unit 18. In other words, the rotor housing 10a and the stator housing 11a are employed in association with the multiple rotation detecting unit 3 and the rotor housing 10b and the stator housing 11b are employed in association with the single rotation detecting unit 18. Therefore, the multiple rotation detecting unit 3 and the single rotation detecting unit 18 can be installed separately, resulting in increase of the freedom of design. Other structural features of this embodiment are similar to those of the embodiment shown in and described with reference to FIG. 4.

Where in the practice of any one of the embodiments shown in FIGS. 4 and 7, respectively, each of the multiple rotation detecting unit 3 and the single rotation detecting unit 18 is employed in the form of the sensor housing, in which the Hall ICs are arranged 90° displaced in phase from each other, the respective sensor housings, forming the multiple rotation detecting unit 3 and the single rotation detecting unit 18 may be formed integrally with each other, allowing the detecting members 15 and 20 to be compact in size.

It is to be noted that in any one of the first to third embodiments described hereinabove, the various component parts have been shown and described as provided in the rotor housing 10 mounted on the rotary shaft 36, and in the stator housing 11 fixed to the stationary member 9 such as, for example, the housing. However, by modifying shapes of the rotary shaft 36 and/or the stationary member 9 has a modified shape different to that shown, those various component parts may be provided directly in the rotary shaft 36 and/or the stationary member 9.

Hereinafter, as a fourth preferred embodiment of the present invention, an embodiment of a multiple rotation absolute angle detecting device incorporated bearing assembly utilizing the multiple rotation absolute angle detecting device of the structure shown and described in connection with the foregoing first embodiment of the present invention will be described. This fourth embodiment will now be described with particular reference to FIGS. 2, 3 and 8.

The multiple rotation absolute angle detecting device incorporated bearing assembly, generally identified by A, is of a type used as, for example, a steering sensor for a steering wheel. This multiple rotation absolute angle detecting device incorporated bearing assembly A is of a structure, in which a rolling bearing unit 21 including a rotatable raceway ring 22, a stationary raceway ring 23 and rolling elements 24 is provided with the multiple rotation absolute angle detecting device 1 including the reduction gear mechanism 2 and the multiple rotation detecting unit 3. The reduction gear mechanism 2 converts the rotation of the rotatable raceway ring 22 into a speed-reduced rotation. The multiple rotation detecting unit 3 is operable to detect the speed-reduced rotation converted by the reduction gear mechanism 2. In this embodiment, the rotatable raceway ring 22 of the bearing unit 21 corresponds to the rotatable member and the stationary raceway ring 23 of the bearing unit 21 corresponds to the stationary member. The rotatable raceway ring 22 of the rolling bearing unit 21 is made up of an inner race, the stationary raceway ring 23 is made up of an outer race, and the rolling elements 24 are made up of balls. The inner race 22 is fixedly press-fitted in an outer periphery of the rotary shaft 36.

The reduction gear mechanism 2 referred to above includes an eccentric ring 4 fixed adjacent the inner race 22 for rotation together with the inner race 22, an internally threaded member 5 fitted adjacent the outer race 23 in coaxial relation with the rotary shaft 36, an externally threaded member 6 and a speed reducing member 7. The externally threaded member 6 rotates about the axis O' of eccentric rotation of the eccentric ring 4 by meshing with the internally threaded member 5. The speed reducing member 7 referred to above is a member rotatably mounted the inner race 22 side for rotation about the longitudinal axis O of the rotary shaft 36 and driven by a drive, transmitted from the externally threaded member 6, at a speed equal to that of the externally threaded member 6.

One end of the inner periphery of the inner race 22 is fixedly mounted with a cylindrical rotor housing 10 by means of press-fitting, and the outer periphery of the rotor housing 10 is fixedly mounted with the eccentric ring 4 by means of press-fitting bond in a manner similar to that in the previously described first embodiment.

The stator housing 11 is fixedly press-fitted adjacent one end of the outer periphery of the outer race 23, which is on the same side as the protruding end of the rotor housing 10, in a manner similar to that in the previously described first embodiment, and the internally threaded member 5 referred to above is fixedly press-fitted in or bonded to the inner periphery of the stator housing 11.

Figure 8:
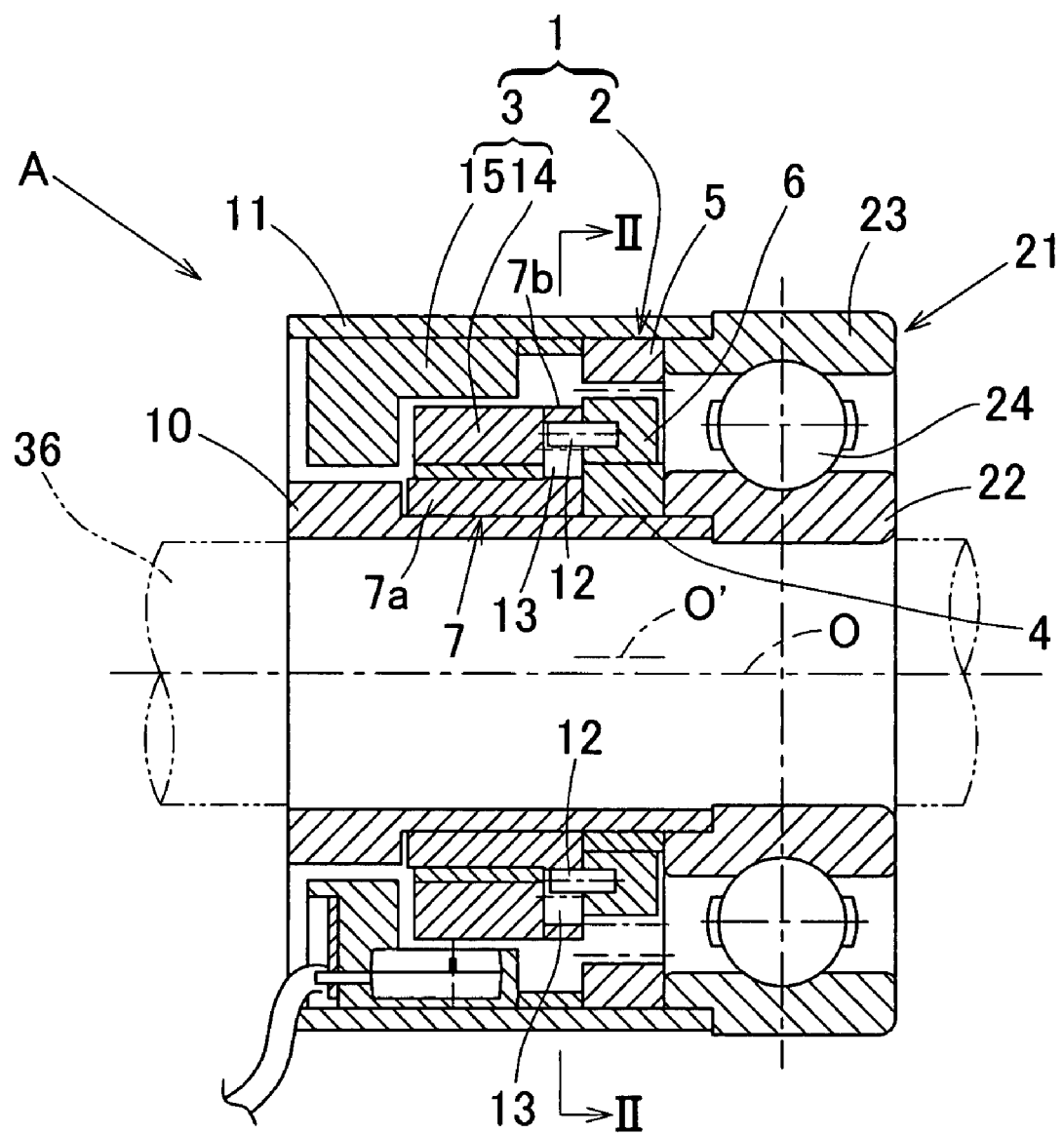
FIG. 8 is a sectional view of the multiple rotation absolute angle detecting device according to a fourth preferred embodiment of the present invention.

In FIG. 8, the to-be-detected member 14 is shown as employed in the form of a magnetic encoder and the detecting member 15 is shown as employed in the form of a sensor housing, in which Hall ICs are arranged having been displaced 90° in phase from each other. In such case, the sensor housing may be of a type integrally molded together with the Hall ICs with a resinous material.

The operation of the multiple rotation absolute angle detecting device incorporated bearing assembly A will be hereinafter described. This operation is substantially similar to that of the previously described first embodiment, and since the rotation of the rotary shaft 36 is reduced by the reduction gear mechanism 2 at a reduction gear ratio of 1/L to be converted into rotation of the speed reducing member 7, one complete rotation of the speed reducing member 7 corresponds to L rotations of the rotary shaft 36. In view of this, the absolute angle of L rotations of the rotary shaft 36 can be detected from the output waveform of the detecting member 15 of the multiple rotation detecting unit 3.

As hereinabove described, in this multiple rotation absolute angle detecting device incorporated bearing assembly A, since an inscribed planetary gear mechanism including the eccentric ring 4, the internally threaded member 5 and the externally threaded member 6, and a uniform speed internal gear mechanism including the externally threaded member 6 and the speed reducing member 7 cooperate with each other to form the reduction gear mechanism 2 of a high reduction gear ratio, the multiple rotation absolute angle detecting mechanism can be constructed of a compact shaft-through type, a high reduction gear ratio can also be obtained, and the multiple rotation absolute angle can be detected over the wide range.

Figure 9:
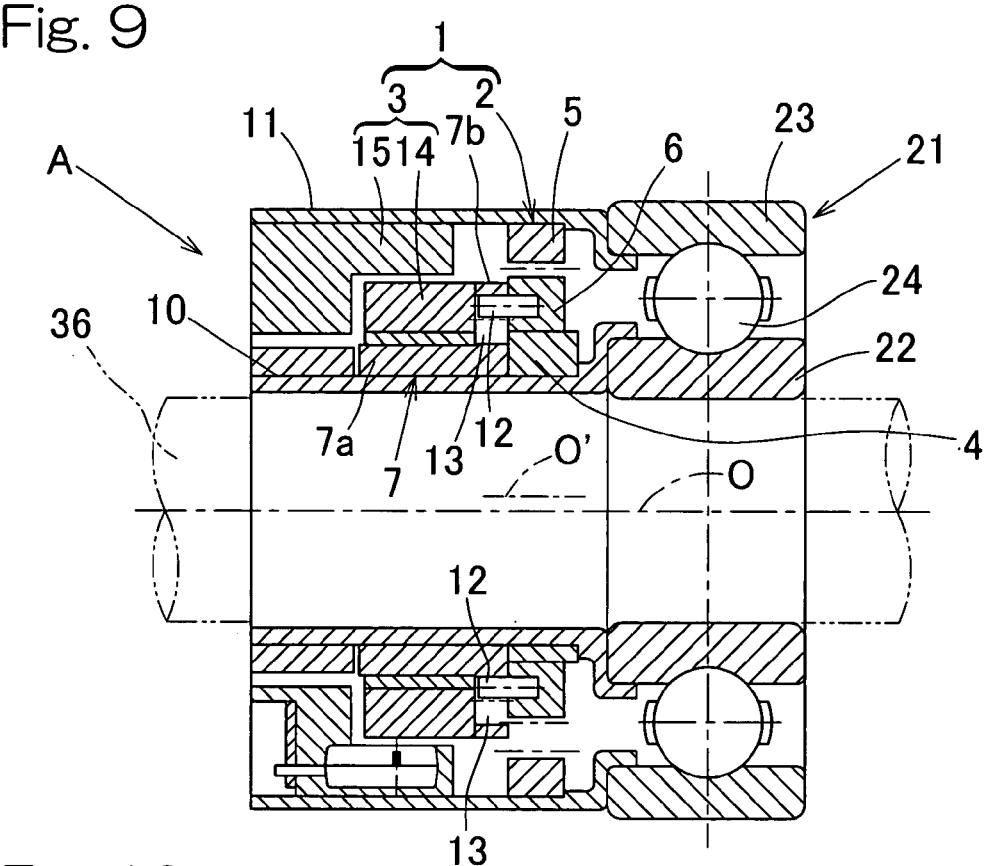
FIG. 9 is a sectional view of a bearing assembly equipped with the multiple rotation absolute angle detecting device according to a fifth preferred embodiment of the present invention.

FIG. 9 illustrates a fifth preferred embodiment of the present invention. The multiple rotation absolute angle detecting device incorporated bearing assembly A is similar to that shown and described in connection with the foregoing fourth embodiment of FIG. 8, but differs therefrom in that the rotor housing 10 is fixed to the outer periphery of the inner race 22 and the stator housing 11 is fixed to the inner periphery of the outer race 23. Other structural features of this embodiment are similar to those in the fourth embodiment of FIG. 4.

Figure 10:
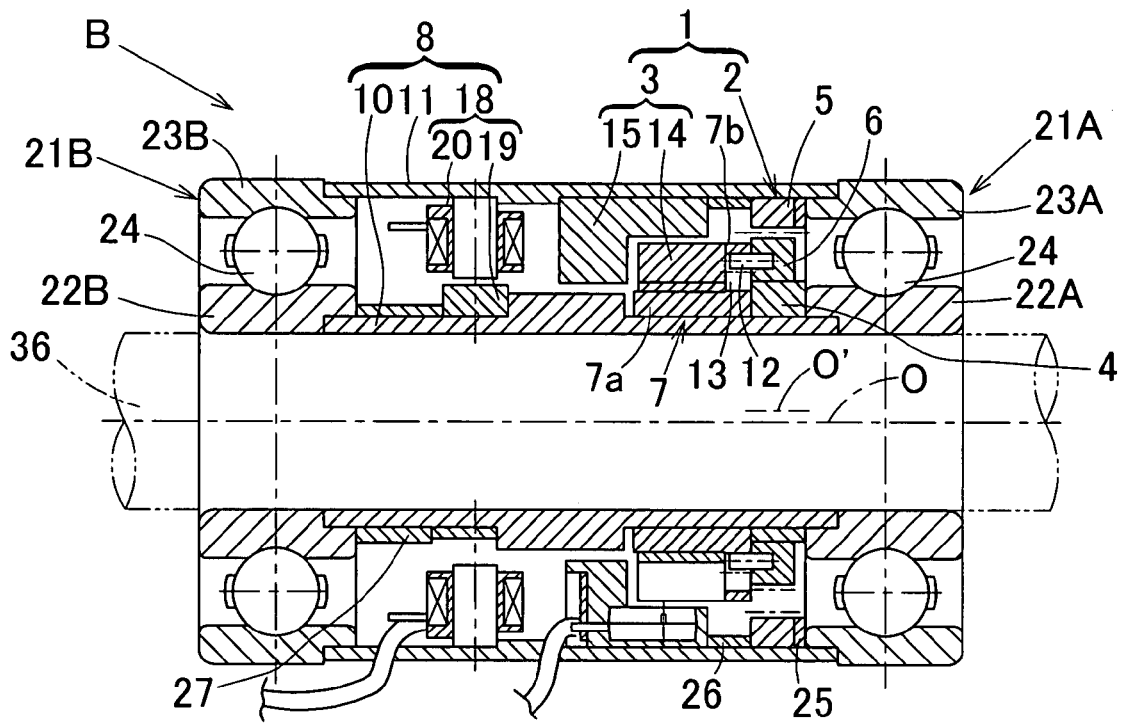
FIG. 10 is a sectional view of the bearing assembly equipped with the multiple rotation absolute angle detecting device according to a sixth preferred embodiment of the present invention.

FIG. 10 illustrates a sixth preferred embodiment of the present invention. This multiple rotation absolute angle detecting device incorporated bearing assembly, now generally identified by B, is similar to that according to the previously described fourth embodiment of FIG. 4, but differs therefrom in that separate from the multiple rotation absolute angle detecting device 1, a single rotation detecting mechanism 8 for detecting one complete rotation of the rotary shaft 36 is employed. In other words, it is a multiple rotation absolute angle detecting device incorporated bearing assembly B utilizing the multiple rotation absolute angle detecting device 1A shown and described in connection with the second embodiment of FIG. 4. The to-be-detected member 19 is employed in the form of a rotor of a resolver and the detecting member 20 is employed in the form of a stator of the resolver.

In the sixth embodiment described above, the multiple rotation absolute angle detecting mechanism comprised of the multiple rotation absolute angle detecting device 1 and the single rotation detecting mechanism 8 is disposed between two rolling bearing units 21A and 21B that are juxtaposed relative to each other in a direction axially thereof. In such case, the rotor housing 10 is fixed straddling respective inner peripheries of inner races 22A and 22B of the two rolling bearing units 21A and 21B and the stator housing 11 is fixed straddling respective outer peripheries of outer races 23A and 23B thereof.

Also, in the sixth embodiment, a spacer 25 is interposed between the outer race 23A and the internally threaded member 5; a spacer 26 is interposed between the internally threaded member 5 and the detecting member 15 of the multiple rotation detecting unit 3; and a spacer 27 is interposed between the to-be-detected member 19 of the single rotation detecting unit 18 and the inner race 22B. Accordingly, the to-be-detected member 19 of the single rotation detecting unit 18 is axially positioned. It is to be noted that of those spacers 25 to 27, the spacer 25 may be substituted by a wavy washer or spring and, at the same time, one of the outer races of the rolling bearing units 21A and 21B may be axially slidably mounted on the stator housing 11 without being fixedly press-fitted to the stator housing 11, but by means of a loose fitting method. By so doing, a mechanism for applying a preload to the rolling bearing units 21A and 21B may be formed. In addition, in this preload applying mechanism, if the axial length of the spacer 25 is fixed, it is possible to accomplish a preload at a predetermined position. Other structural features of the sixth embodiment are similar to that shown and described in connection with the fourth embodiment of FIG. 8.

Figure 11:
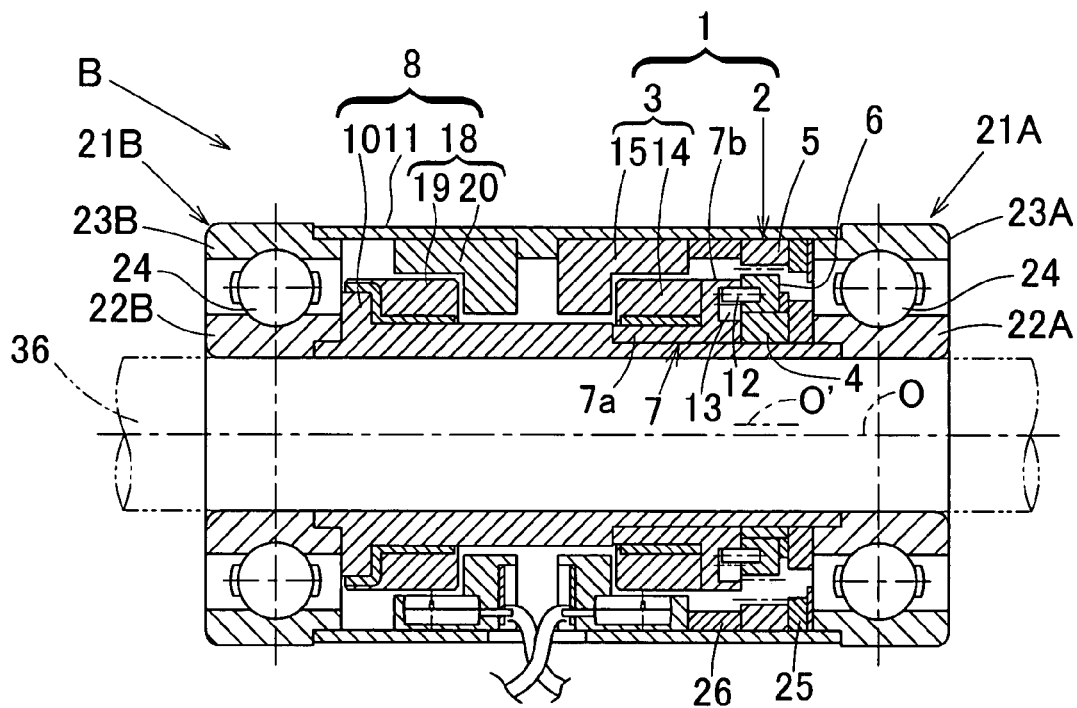
FIG. 11 is a sectional view of the bearing assembly equipped with the multiple rotation absolute angle detecting device according to a seventh preferred embodiment of the present invention.

FIG. 11 illustrates a seventh preferred embodiment of the present invention. The multiple rotation absolute angle detecting device incorporated bearing assembly B is similar to that according to the sixth embodiment of FIG. 10, but differs therefrom in that the single rotation detecting unit 18 includes a to-be-detected member 19 in the form of a magnetic encoder, and a detecting member 20 in the form of a sensor housing, in which Hall ICs are arranged displaced 90° in phase from each other. In other words, this bearing assembly B is the multiple rotation absolute angle detecting device incorporated bearing assembly B utilizing the multiple rotation absolute angle detecting device 1A which has been shown and described in connection with the third embodiment with reference to FIG. 3. In this case, the sensor housing may be integrally molded together with the Hall ICs with the use of a resinous material. Also, in this embodiment, even the multiple rotation detecting unit 3 includes a to-be-detected member 14 in the form of a magnetic encoder, and a detecting member 15 in the form of a sensor housing, in which Hall ICs are arranged displaced 90° in phase from each other. Other structural features of the sixth embodiment are similar to that shown and described in connection with the embodiment of FIG. 10. In such case, the respective sensor housings, which form the detecting members 15 and 20 of the multiple rotation detecting unit 3 and the single rotation detecting unit 18, respectively, may be formed integrally with each other, so that those detecting members 15 and 20 can be constructed compactly.

Figure 12:
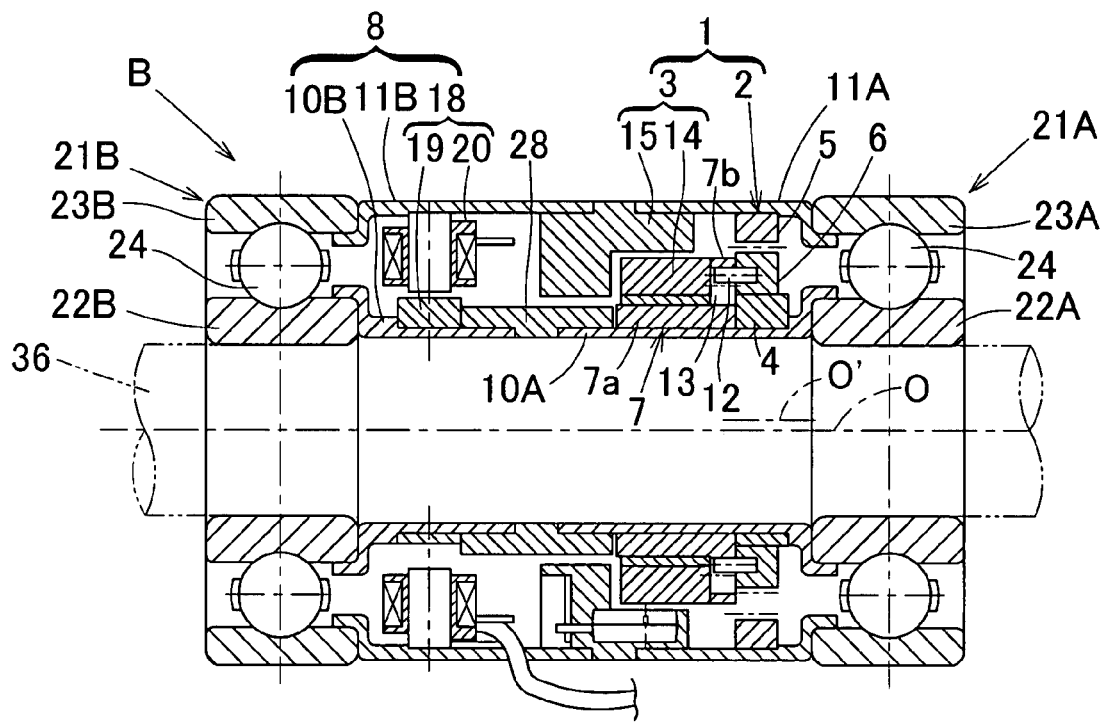
FIG. 12 is a sectional view of the bearing assembly equipped with the multiple rotation absolute angle detecting device according to an eighth preferred embodiment of the present invention.

FIG. 12 illustrates an eighth preferred embodiment of the present invention. The multiple rotation absolute angle detecting device incorporated bearing assembly B according to this embodiment is similar to that according to the sixth embodiment shown in FIG. 6, but differs therefrom in that the rotor housing 10 is replaced with a rotor housing 10A, which is fixedly press-fitted on the outer periphery of the inner race 22A of the rolling bearing unit 21A, and a rotor housing 10B fixedly press-fitted on the outer periphery of the inner race 22B of the other rolling bearing unit 21B; that the stator housing 11 is replaced with a stator housing 11A, which is fixedly press-fitted in the inner periphery of the outer race 23A of the rolling bearing unit 21A, and a stator housing 11B fixedly press-fitted in the inner periphery of the outer race 23B of the other rolling bearing unit 21B; and in that the rotor housings 10A and 10B are connected together by means of a coupling member and the stator housings 11A and 11B are connected together by means of a coupling member. In other words, in this embodiment, the multiple rotation absolute angle detecting device 1 is fitted to the rolling bearing unit 21A and the single rotation detecting mechanism 8 is fitted to the other rolling bearing unit 21B, with the multiple rotation absolute angle detecting device 1 and the single rotation detecting mechanism 8 connected together by means of a coupling member. It is to be noted that for connection between the rotor housings 10A and 10B, a separate coupling member 28 is employed, and for connection between the stator housings 11A and 11B, the detecting member 15 of the multiple rotation absolute angle detecting unit concurrently serves as a coupling member. Further, the detecting member 20 of the single rotation detecting unit may be designed to concurrently serve as a coupling member for connecting the stator housings 11A and 11B together. With this design, a connecting structure can be downsized.

The single rotation detecting mechanism 8 includes the rotor housing 10B, the stator housing 11B and the single rotation detecting unit 18. Other structural features of this embodiment are generally similar to those according to the sixth embodiment shown in and described with reference to FIG. 10.

As hereinabove described, in this embodiment, since the multiple rotation absolute angle detecting device 1 and the single rotation detecting mechanism 8 are fitted respectively to the rolling bearing unit 21A and the other rolling bearing unit 21B and are connected with each other, the assemblability of the multiple rotation absolute angle detecting mechanism can be increased.

Figure 13:
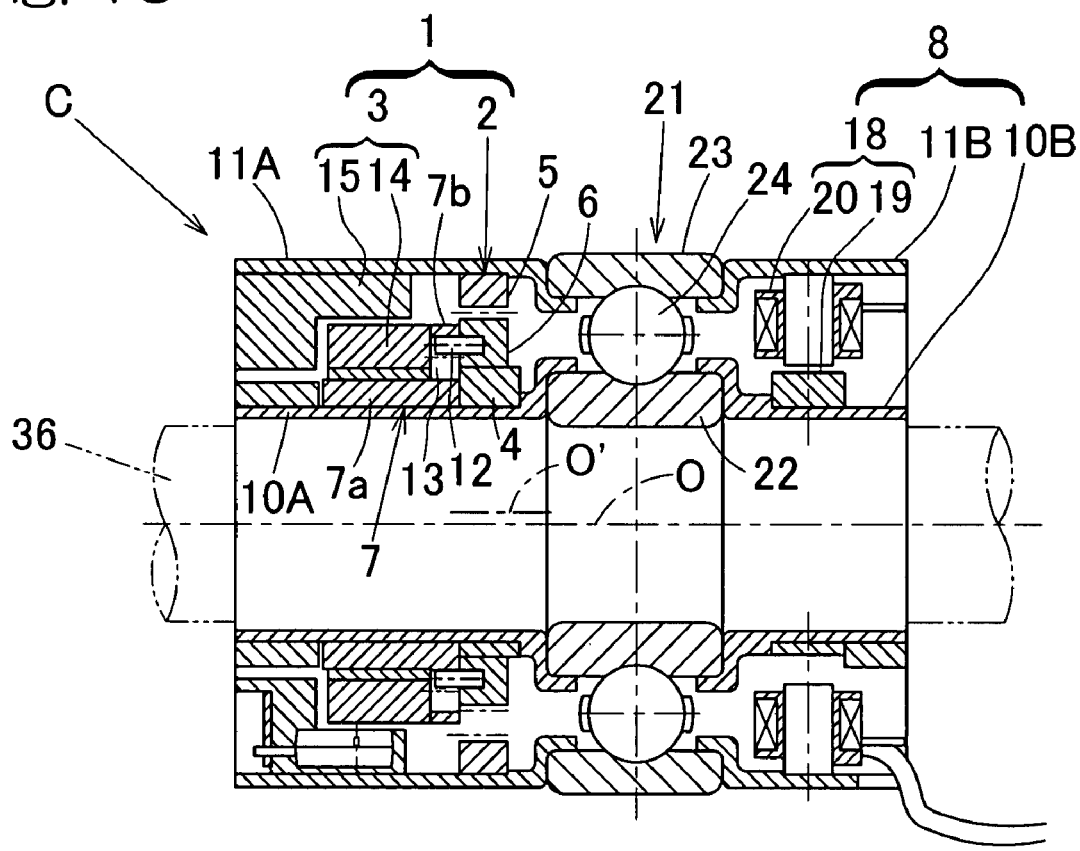
FIG. 13 is a sectional view of the bearing assembly equipped with the multiple rotation absolute angle detecting device according to a ninth preferred embodiment of the present invention.

FIG. 13 illustrates a ninth preferred embodiment of the present invention. This multiple rotation absolute angle detecting device incorporated bearing assembly generally identified by C is similar to that according to the eighth embodiment shown in and described with reference to FIG. 12, but differs therefrom in that the two rolling bearing units 21A and 21B are replaced with one rolling bearing unit 21 and the rotor housing 10A and the other rotor housing 10B are fixedly press-fitted to one end of the outer periphery of the inner race 22 and the opposite end of the outer periphery of the inner race 22, respectively. Also, the stator housings 11A and 11B are fixedly press-fitted to one end of the inner periphery of the outer race 23 and the other end of the inner periphery of the outer race 23, respectively. The eccentric ring 4 and the speed reducing member 7 are provided in the outer periphery of the rotor housing 10A, and the internally threaded member 5 and the detecting member 15 of the multiple rotation detecting unit 3 are provided in the inner periphery of the stator housing 11A. In addition, the to-be-detected member 19 of the single rotation detecting unit 18 is provided in the outer periphery of the rotor housing 10B, and the detecting member 20 of the single rotation detecting unit 18 is provided in the inner periphery of the stator housing 11B. In other words, in this embodiment, the multiple rotation absolute angle detecting device 1 is fitted to one end side of the rolling bearing unit 21 and the single rotation detecting mechanism 8 is fitted to the opposite end side thereof. The single rotation detecting mechanism 8 is made up of the rotor housing 10B, the stator housing 11B and the single rotation detecting unit 18.

Figure 14:
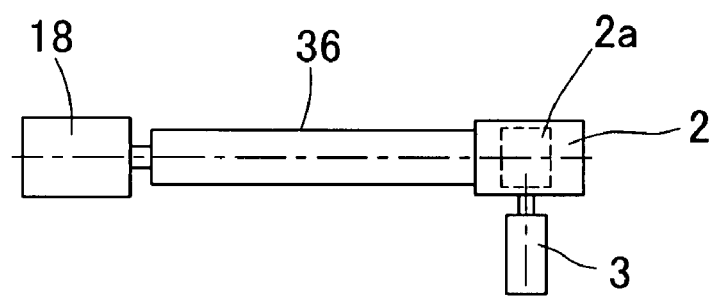
FIG. 14 is a schematic diagram showing the multiple rotation absolute angle detecting device used in the practice of a multiple rotation absolute angle detecting method according to a first application of the present invention.

Although in any one of the first to ninth embodiments hereinabove described, the eccentric ring 4 has been employed, the present invention can be similarly applied to the case where no eccentric ring 4 is employed. In the following description, a first application of the present invention will be described with particular reference to FIGS. 14 to 20. FIG. 14 is a conceptual diagram of the multiple rotation absolute angle detecting device that is used in the practice of this multiple rotation absolute angle detection method. A rotatable member is in the form of a rotary shaft 36 that is supported by a bearing assembly (not shown), and the reduction gear mechanism 2 for the detection of multiple rotations is connected with this rotary shaft 36. The single rotation detecting unit 18 for detecting the absolute rotation angle of the rotary shaft 36 is provided on the rotary shaft 36 in coaxial relation therewith. The reduction gear mechanism 2 is provided with the multiple rotation detecting unit 3 for detecting the absolute rotation angle of the output portion 2a of the reduction gear mechanism 2.

The single rotation detecting unit 18 is an absolute angle detecting device capable of outputting a sinusoidal or sawtooth wave having n periods for each complete rotation of the rotary shaft 36 and is comprised of, for example, a resolver or the like, of which output is 1X. n represents a natural number, that is, n=1, 2, 3, ....

The multiple rotation detecting unit 3 is an absolute angle detecting device capable of outputting a sinusoidal or sawtooth wave having one period for each complete rotation of the reduction gear mechanism output portion 2a and is comprised of, for example, a resolver or the like, of which output is 1X.

The number of rotations is determined in reference to the output from the multiple rotation detecting unit 3 while the absolute angle during multiple rotations can be detected with further accuracy from the output of the single rotation detecting unit 18.

It is to be noted that although in FIG. 14, the single rotation detecting unit 18 and the reduction gear mechanism 2 have been shown and described as positioned respectively on the opposite ends of the rotary shaft 36, they can be positioned anywhere on the rotary shaft 36. It is also to be noted that although the multiple rotation detecting unit 3 is not disposed in coaxial relation with the rotary shaft 36, it may be disposed coaxially with the rotary shaft 36. The reduction gear mechanism 2 may employ any suitable mechanism such as, for example, a train of spur gears, as long as it can serve to reduce the rotational speed of the rotary shaft 36.

When the angle is to be detected with the use of the angle detecting device shown in FIG. 14, even the conventional method can calculate the absolute angle of five rotations with high accuracy by setting the reduction gear ratio of the reduction gear mechanism 2 to 1/5. However, only with the signals S1 and S2, it is not possible to determine whether the rotation is in the positive direction or in the negative direction. For this reason, only the absolute angle of a number of rotations (five rotations) of the reduction gear ratio (denominator) can be calculated.

In view of the above, according to the first application of the present invention, the gear ratio of the reduction gear mechanism 2 is chosen to be a halfway value such as, for example, 1/5.2 or 1/5.5. In other words, the value of L in the reduction gear ratio of 1/L is chosen to be a non-integer. By so selecting, the determination of whether the rotation is in the positive direction or in the negative direction can be determined. In general, when the number of periods outputted from the single rotation detecting unit 18 is expressed by n (which is a natural number), it is recommended to set the decimal portion α of L in the reduction gear ratio of 1/L to a value expressed by the following relation:

$\alpha \neq \beta/n$ (wherein $0 \leq \beta \leq n-1$ and $\beta$ is an integer)

The value α is calculated within the range of $0 \leq \alpha \leq 1$.

The manner of this calculation is such as shown in FIG. 6. In the instance now under discussion, the single rotation detecting unit 18 outputs a sawtooth wave of one period for each complete rotation of the rotary shaft 36 and the multiple rotation detecting unit 3 outputs a sawtooth wave of one period for each complete rotation of the reduction gear mechanism output portion 2a. As can readily be understood from this figure, even though one value (SM1 or SM2) of the output signal S2 of the multiple rotation detecting unit 3 corresponds to both rotations in positive and negative directions, the value of the output signal S1 of the single rotation detecting unit 18 differs depending on whether the rotation is in the positive direction (SS+1, SS+2) in the negative direction (SS−1, SS−2) and, therefore, whether the rotation is in the positive direction or in the negative direction can be determined. In particular, in the case of the reduction gear ratio being 1/5.5, the rotation in the positive direction and the rotation in the negative direction bring about the maximum difference in values of the output signal S1 of the single rotation detecting unit 18 (i.e., it will assume half the power source voltage Vc and 180° phase difference when converted in angle).

By setting the reduction gear ratio of 1/L of the multiple rotation detecting unit 3 to a proper value in order to accommodate the number n (n being 1, 2, 3, ...) of periods outputted from the single rotation detecting unit 18 as shown below, the determination can be facilitated even when ±r rotations (r being an integer) are to be detected.

$L = r + 1/(2n)$

Nevertheless, as a reduction gear ratio of 1/L greater than the number of rotations desired to be actually detected, only the decimal portion of the value of L may be matched with 1/(2n). Alternatively, the decimal portion of the value of L may be set to $a/n + 1/(2n)$ (wherein $0 \leq a \leq n$ and a is an integer). Yet, where the number of rotations detected is not an integer, it is recommended to satisfy the conditions hereinabove described and also to select the reduction gear ration of 1/L so that the value of L may become equal to or greater than r.

Figure 16:
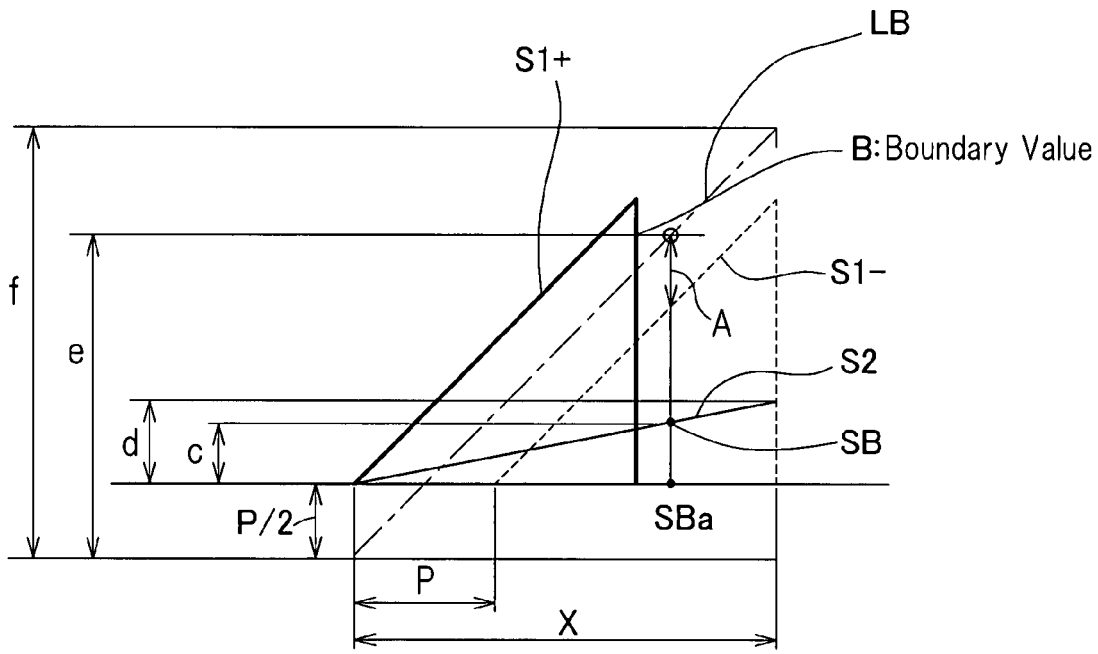
FIG. 16 is an explanatory diagram used to explain the boundary value.
Figure 17:
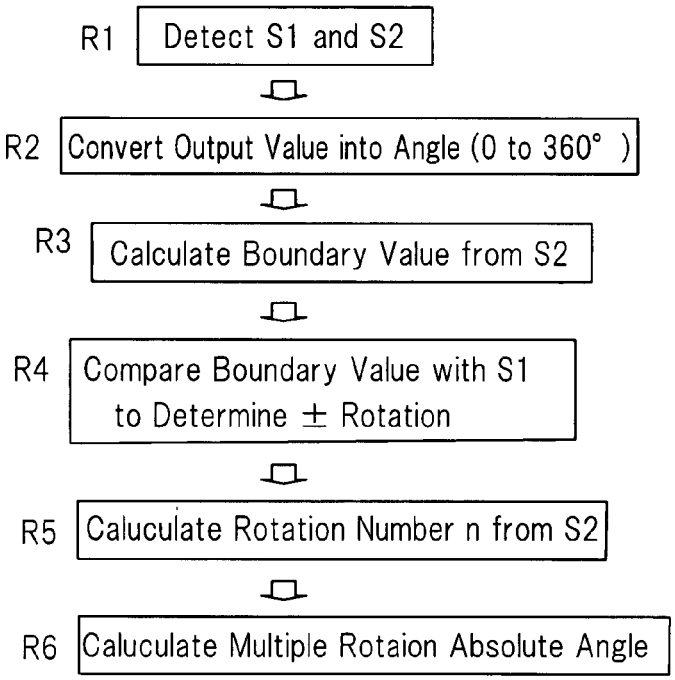
FIG. 17 is a flowchart showing the algorithm of the method of detecting the multiple rotation absolute angle according to the first application.

FIG. 17 is a flowchart showing the algorithm of the multiple rotation absolute angle detection method described above. Also, in FIGS. 15 and 16, the output signal S1 of the single rotation detecting unit 18 overlapped over the output signal S2 of the multiple rotation detecting unit 3 taken as a reference is shown. Based on those figures, the algorithm will be described.

At step R1, the respective output signals S1 and S2 of the single rotation detecting unit 18 and the multiple rotation detecting unit 3, which are outputted substantially linearly during one complete rotation, are detected. Those output signals S1 and S2 represent a voltage value of [V].

At step R2, those output signals S1 and S2 of this voltage are, after the proportion between the voltage V and the power source voltage Vc has been calculated, converted into angles (within the range of 0 to 360°). This voltage-to-angle converting process may be carried out at any step prior to step R6, but depending on the step at which such process is carried out, equations to be performed at steps R3 to R5 vary.

At step R3, a boundary value B is calculated using the output signal S2 of the multiple rotation detecting unit 3 obtained at step R2.

This boundary value B preferably lies at a point intermediate between the output signal S1+ of the single rotation detecting unit 18 during the rotation in the positive direction and the output signal S1− of the single rotation detecting unit 18 during the rotation in the negative direction. The term "intermediate point" referred to above means a center.

Figure 15:
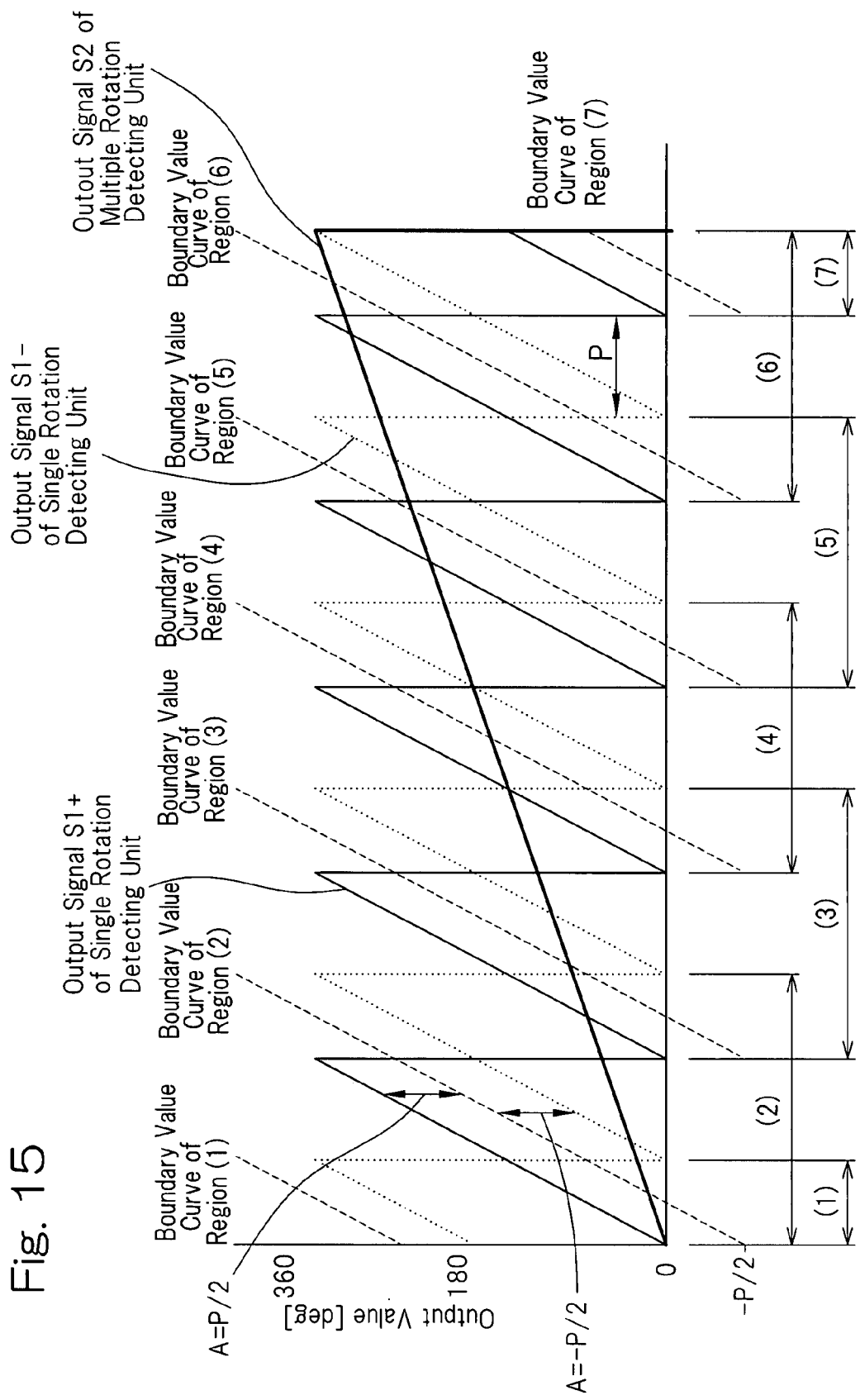
FIG. 15 is a chart showing the waveforms, in which output signals of the single rotation detecting unit, obtained during the rotations in the positive and negative directions, are shown in overlapped relation with each other, and output signals of the multiple rotation detecting unit are shown as overlapped therewith.

As can readily be understood from FIG. 15, the boundary value B which defines the intermediate point lies on the straight line (hereinafter referred to the boundary value curve LB) having the same slope as that of the output signal S1+ of the single rotation detecting unit 18 during the direction in the positive direction and the output S1− of the single rotation detecting unit 18 during the rotation in the negative direction. The output signal S1+ of the single rotation detecting unit 18 during the direction in the positive direction and the output S1− of the single rotation detecting unit 18 during the rotation in the negative direction represent a straight line of a slope 1 since when the angle of the rotary shaft 36 (shown in the axis of abscissa in FIG. 15) changes from 0° to 360°, the output value (shown in the axis of ordinate in FIG. 15) also changes from 0° to 360°. Because of this, the boundary value B also lies on the straight line of a slope 1 (the boundary value straight line LB). Also, the difference in phase P between the output signal S1+ of the single rotation detecting unit 18 during the direction in the positive direction and the output S1− of the single rotation detecting unit 18 during the rotation in the negative direction can readily be determined from the reduction gear ration of 1/L.

The phase difference P referred to above will be 360°×0.5 and, hence, 180° where the decimal portion of L in the reduction gear ratio 1/L is 0.5, but will be 360°×0.2 and, hence, 72° where the decimal portion thereof is 0.2.

Where 0° of the output signal S1+ of the single rotation detecting unit 18 during the direction in the positive direction is assumed to be the origin (shown in a left portion of FIG. 15), the output signal S1+ of the single rotation detecting unit 18 during the direction in the positive direction will exhibit a straight line of a slope 1 and an intercept 0 and the output S1− of the single rotation detecting unit 18 during the rotation in the negative direction will exhibit a straight line of a slope 1 and an intercept −P.

In other words, the boundary value B lines on the boundary value curve LB, which is a straight line of a slope 1 and an intercept −P/2. This boundary value curve LB is defined prior to the angle detection.

The boundary value B can be calculated according to the following procedures. Referring now to FIG. 16, in reference to the value SB of the output signal S2 of the multiple rotation detecting unit 3, the angle SBa (on axis of abscissas) to be substituted in the boundary value curve LB is determined, and the boundary value B (on axis of ordinate) on the boundary value curve LB at this angle SBa is then determined using the following proportional equation of a triangle. When SB=c, the level width of the multiple rotation output signal S2 within the angle range from the origin to X=P+360° is expressed by d, the level width (difference on the boundary value curve LB) of the boundary value within the angle range from the origin to the angle SBa referred to above is expressed by e, and the level width (difference on the boundary value curve LB) of the boundary value within the angle range from the origin to X=P+360° is expressed by f, the boundary width e is so determined as to satisfy (c:d=e:f) and the parameter B is calculated based on B=e−P/2.

At step R4, a difference A between the output signal S1 of the single rotation detecting unit 18 and the boundary value B is determined and, then, the determination of the positive (+) rotation or the negative (−) rotation is carried out relying on the sign and the magnitude of such difference A.

Where the difference between the output signal S1 of the single rotation detecting unit 18 and the boundary value B is defined as A (=S1−B), the determining conditions are described as follows in the case of FIG. 15.

In the case that the output signal S2 of the multiple rotation detecting unit 3 or the output signal S1 of the singe rotation detecting unit 18 form an ideal waveform which is free from any error and noises, the determination can be achieved under the following conditions when the difference A is determined for each of regions (1) to (7).

[1] In the case of A=P/2, it is determined as the rotation in the positive direction.

[2] In the case of A=−P/2, it is determined as the rotation in the negative direction.

It is, however, to be noted that since in practice an error and/or noises occur in the output signal S2 of the multiple rotation detecting unit 3 or the output S1 of the single rotation detecting unit 18, the difference A is determined for each of the regions (1) to (7) and the determination is then carried out under the following conditions.

[1] In the case of $0 \leqq A \leqq P/2+\alpha$, or $A \geqq 360°$, it is determined as the rotation in the positive direction.

[2] In the case of $-(P/2+\alpha) \leqq A < 0$, or $A < -360°$, it is determined as the rotation in the negative direction.

[3] In the case of $A \leqq 0$ without any of the conditions [1] and [2] above being satisfied in any of the regions (1) to (7), it is determined as the rotation in the positive direction.

[4] In the case of $A > 0$ without any of the conditions [1] and [2] above being satisfied in any of the regions (1) to (7), it is determined as the rotation in the negative direction.

Here, $A \geqq 360$, $A < -360$, the conditions [3] and [4] above are used for the determination of a boundary portion of the regions. (The details thereof are not herein described.)

The value of α referred to in the conditions is an arbitrarily chosen value selected in consideration of the phase difference P, and the angle error and noises actually occurring in the rotation angle detecting device such as, for example, the resolver, which forms the single rotation detecting unit 18 and the multiple rotation detecting unit 3. By adjusting this value, it is possible to allow the determination of the rotation in the positive (+) direction or in the negative (−) direction to be carried out further accurately.

When the ±positive-or-negative determination is made, the number of rotations (−r rotations to +r rotations) can be determined from the output signal S2 of the multiple rotation detecting unit 3. At this time, in view of the presence of an error and/or noises of the rotation angle detecting device in the multiple rotation detecting unit 3, the boundary portion of the number of rotations is preferably determined from the output signal S1 of the single rotation detecting unit 18. This corresponds to a process carried out at step R5.

Finally at step R6, the absolute angle θ of the multiple rotation is calculated using the number of rotations and the output signal S1 of the single rotation detecting unit 18.

When the above described method is employed, the final accuracy of the absolute angle of multiple rotations becomes substantially equal to that of the output of the single rotation detecting unit 18. By way of example, in the case the resolver is employed for the single rotation detecting unit 18, it is generally said that the accuracy of the angle calculation increases with increase of the number n of periods of the output waveform. It is to be noted that where the number n of the periods of the output waveform (S1) is assumed to be smaller than 1, i.e., n<1, it is necessary to determine which one of the periods the output waveform S1 of the single rotation detecting unit 18 corresponds to, other than the determination of the numbers of rotation in the positive and negative directions, and the accuracy of the multiple rotation detecting unit 3 is also required.

According to the foregoing first application of the present invention, the single rotation detecting unit 18 and the multiple rotation detecting unit 3 have been shown and described as employing the rotation angle detecting device (for example, the resolver). However, two Hall ICs, displaced 90° in phase relative to the to-be-detected member, may be employed for each of the single rotation detecting unit 18 and the multiple rotation detecting unit 3. In such case, the absolute angle for each complete rotation can be calculated by detecting signals p and q displaced 90° in phase from each other with one cycle represented by each complete rotation (wherein p represents a sinusoidal wave and q represents a cosine wave), and calculating such absolute angle by means of a quadrant determination of p/q and each output with the half value Vc/2 of the power source voltage Vc set to zero.

In order to perform the assured determination of the number of rotations and also to increase the angle calculating accuracy of the single rotation detecting unit 18 during the multiple rotations, at least one of the multiple rotation detecting unit 3 and the single rotation detecting unit 18 preferably has a correction table for the rotation angle detecting device.

Figure 18:
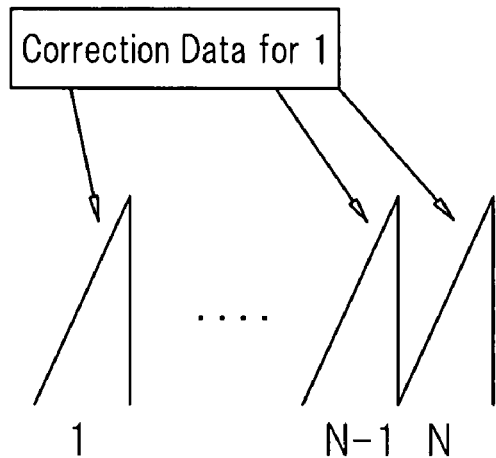
FIG. 18 is an explanatory diagram showing one example of a method of correcting the output waveform.

FIG. 18 illustrates an example of use of the correction table of the single rotation detecting device 18. The correction table is provided with correction data for correcting the actual output of the rotation angle detecting device to an ideal waveform. In the example shown therein, a correction table is prepared with respect to the sawtooth wave of one period and is applied to the sawtooth wave of all periods.

Figure 19:
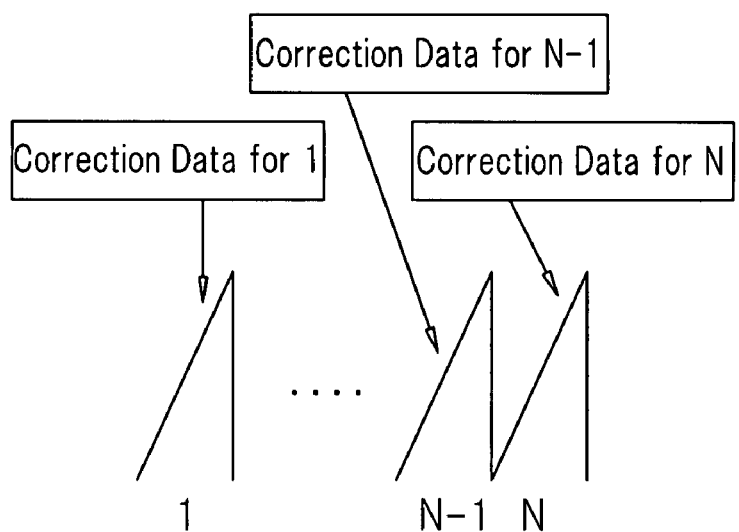
FIG. 19 is an explanatory diagram showing another example of a method of correcting the output waveform.

FIG. 19 illustrates a correction method using respective correction tables for the sawtooth wave of all periods. Since the number of rotations is calculated at step R5 shown in FIG. 19, the absolute rotation angle during the multiple rotations may be calculated by selecting the correction table for the sawtooth wave of that number of rotation. The use of the correction tables for all of the sawtooth waves is effective to further increase the angle detecting accuracy.

Figure 20A:
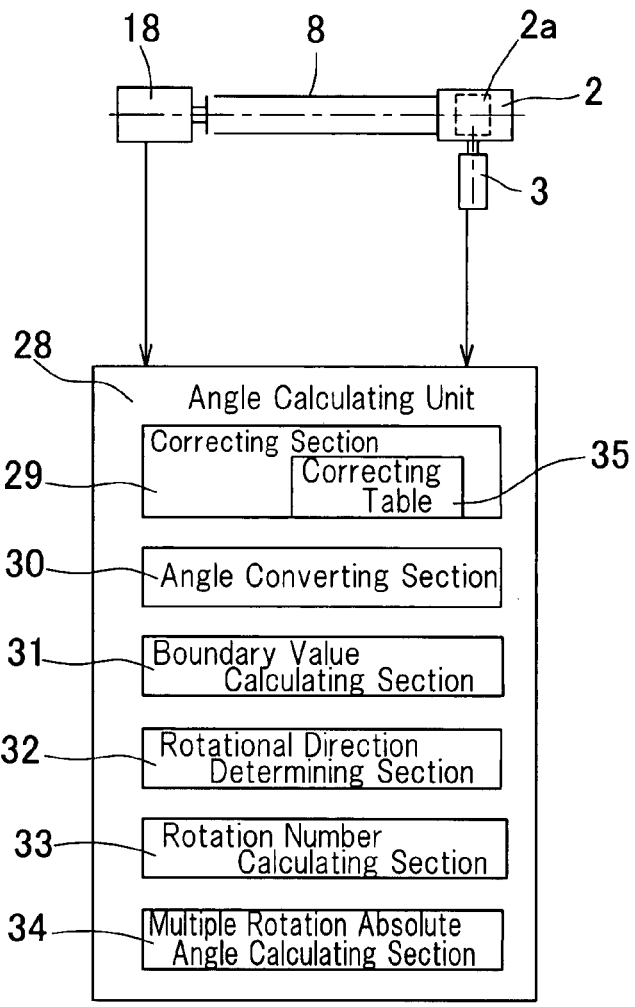
FIG. 20A is an explanatory diagram showing a conceptual structure of the multiple rotation absolute angle detecting device according to a second application of the present invention.
Figure 20B:
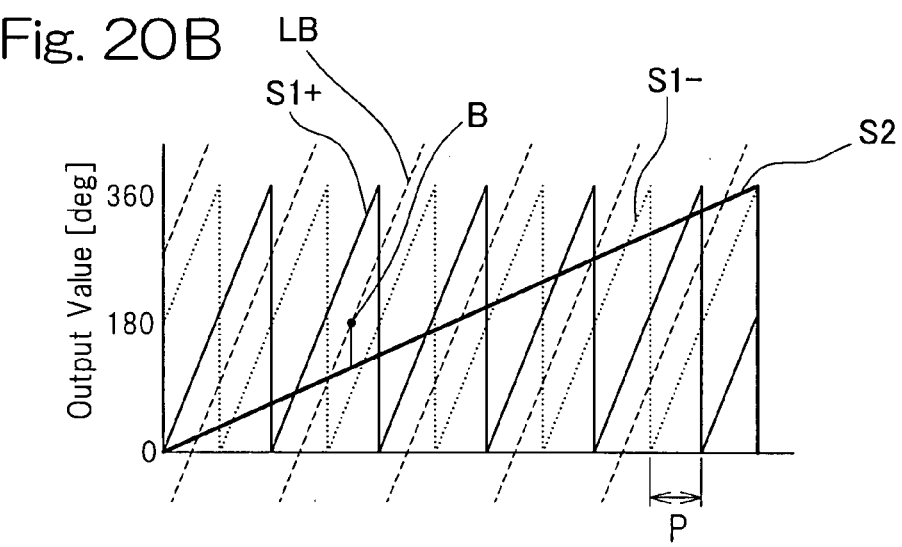
FIG. 20B is an explanatory diagram showing the waveform appearing during the processing performed with the multiple rotation absolute angle detecting device shown in FIG. 20A.

FIGS. 20A and 20B are explanatory diagrams showing the conceptual structure of the multiple rotation absolute angle detecting device according to a second application of the present invention. The illustrated multiple rotation absolute angle detecting device is a device effective to execute the multiple rotation absolute angle detection method according to the previously described application. The rotary shaft 36, the single rotation detecting unit 18, the reduction gear mechanism 2 and the multiple rotation detecting unit 3 have their respective structures identical with those shown in and described with reference to FIG. 14. The single rotation detecting unit 18 and the multiple rotation detecting unit 3 are connected with an angle calculating unit 28 comprised of, for example, an electronic circuit or a computer.

The angle calculating unit 28 includes a correcting section 29, an angle converting section 30, a boundary value calculating section 31, a rotational direction determining section 32, a rotational speed calculating section 33 and a multiple rotation absolute angle calculating section 34.

The correcting section 29 performs the correction which has been described with particular reference to FIG. 18 or 19 and includes a correction table 35. The correction table 35 contains correction data which have been described with reference to FIG. 18 or 19. The angle converting section 30 performs the process described with particular reference to step 2 shown in FIG. 17. The boundary value calculating section 31 referred to above calculates the boundary value in a manner as hereinbefore described with particular reference to step R3 shown in FIG. 17. The rotational direction determining section 32 referred to above determines the direction of rotation of the rotary shaft 36 in a manner as hereinbefore described with particular reference to step R4 shown in FIG. 17. The rotational speed calculating section 33 calculates the number n of rotations in a manner as hereinabove described with particular reference to step R5 shown in FIG. 17. The absolute angle calculating section 34 referred to above is a means for calculating the absolute rotation angle in a manner as hereinabove described with particular reference to step R6 shown in FIG. 17.

By using the multiple rotation absolute angle detection method of the structure described hereinabove, the multiple rotation absolute angle, which has been described with particular reference to FIGS. 14 to 19 can be performed.

The applications of the present invention shown in and described with reference to FIGS. 14 to 20 include the following modes of application:

Mode 1)

In an absolute angle detection method utilizing a multiple rotation absolute angle detecting device, which includes a reduction gear mechanism coupled with a rotatable member, a single rotation detecting unit and a multiple rotation detecting unit arranged respectively in the rotatable member and an output unit of the reduction gear mechanism, wherein the single rotation detecting unit is operable to detect an absolute angle of the rotatable member by outputting the sinusoidal or sawtooth wave having n periods (n being a natural integer) during each complete rotation of the rotatable member and the multiple rotation detecting unit is operable to detect an absolute angle of the reduction gear mechanism output unit by outputting a sinusoidal or sawtooth wave having one period during each complete rotation of the reduction gear mechanism output unit:

wherein the value of L in the reduction gear ratio of 1/L of the reduction gear mechanism is a non-integer; and a step of determining the positive or negative relative to the original position of the rotatable member with the use of a boundary value calculated from the value of the output signal of the multiple rotation detecting unit according to a predetermined calculating standards; and wherein the method includes a step of calculating an absolute rotation angle within ±L rotations from the original position of the rotatable member from the number of rotations determined from the output signal of the multiple rotation detecting unit, a result of determination of the positive or negative and the output signal detected by the single rotation detecting unit.

Mode 2)

In the Mode 1 defined above, the step of determining the positive or negative is carried out by determining the boundary value on the boundary value curve from the output signal of the multiple rotation detecting unit, while the boundary value curve corresponding to the output waveforms with a displaced phase between the output waveforms during the rotation of the single detecting unit in the positive and negative directions, respectively is defined, and comparing the boundary value with the value of the output signal of the single rotation detecting unit to thereby determine the positive or negative direction of rotation with reference to the predetermined standard.

Mode 3)

In the Mode 2 defined above, the single rotation detecting unit and the multiple rotation detecting unit output respective sawtooth waves and during the step of determining the positive or negative, the boundary value curve is a curve, in which the output waveform of the single rotation detecting unit is displaced to a point intermediate between the phases during the rotation in the positive direction and that in the negative direction, and the determination of the positive or negative is carried out by taking a difference between the boundary value in the rotation angle, obtained from the output signal of the multiple rotation detecting unit, and the output signal of the single rotation detecting unit, and comparing a combination of a result of determination of the positive and negative of the difference and a result of determination of the magnitude of the difference relative to a predetermined value with a predetermined determining condition to thereby accomplish the determination of the positive or negative.

Mode 4)

In the Mode defined above, where the number of periods of the sinusoidal wave or sawtooth wave outputted from the single rotation detecting unit is expressed by n (which is a natural number), the decimal portion α of L in the reduction gear ratio 1/L is selected to be such as expressed by the following formula:

$$\alpha \neq \beta/n \ (0 \leq \beta \leq n-1, \text{ where } \beta \text{ is an integer})$$

Mode 5)

In the Mode 1 as defined above, where the range of rotation to be detected is expressed by ±r (which is an integer) and the number of periods of the sinusoidal wave or the sawtooth wave outputted by the single rotation detecting unit during each complete rotation is expressed by n (which is a natural number), the value of L in the reduction gear ratio 1/L is expressed by the following formula:

$$L=r+1/(2n)$$

Mode 6)

In the Mode 1 as defined above, where the range of rotation to be detected is expressed by ±r (which is an integer) and the number of periods of the sinusoidal wave or the sawtooth wave outputted by the single rotation detecting unit during each complete rotation is expressed by n (which is a natural number), the decimal portion of L in the reduction gear ratio 1/L is expressed by the following formula:

$$a/n+1/(2n)$$

$0 \leq a < n$ (wherein a is an integer)

Mode 7)

In the Mode 1 as defined above, the signal outputted from at least one of the multiple rotation detecting unit and the single rotation detecting unit is modified to an ideal waveform.

Mode 8)

In the Mode 1 as defined above, the single rotation detecting unit can perform an assured determination of the rotation and can result in increase of the angle detecting accuracy when provided with a correction data setting a correction value used to the sinusoidal wave or the sawtooth wave outputted, over the entire range of the rotation angle in the positive and negative directions to be detected.

Mode 9)

A multiple rotation absolute angle detecting device for performing the method according to the Mode 1 as defined above, which includes:

a rotational direction determining section for performing a determination of the positive or negative with respect to the original position of the rotatable member with the use of the boundary value calculated from the value of the output signal of the multiple rotation detecting unit according to a predetermined calculating standard;

a rotation number calculating section for calculating the absolute value of the number of rotation based on a result of determination of the positive or negative of the rotational direction by means of the rotational direction determining section and the number of rotations determined from the detected value of the multiple rotation detecting unit; and a multiple rotation absolute angle calculating unit for calculating the absolute rotation angle within the ±L rotations from the original position of the rotatable member, in reference to the absolute value of the number of rotations calculated by the rotation number calculating section and the value of the output of the single rotation detecting unit.

Mode 10)

In the Mode as defined above, the rotational direction determining section determines the boundary value on a boundary value curve from the output signal of the multiple rotation detecting unit, while the boundary value curve corresponding to the output waveforms with a displaced phase between the output waveforms during the rotation of the single detecting unit in the positive and negative directions, respectively, is defined, and compares the boundary value with the value of the output signal of the single rotation detecting unit to thereby determine the positive or negative direction of rotation with reference to the predetermined standard.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A multiple rotation absolute angle detecting device which comprises:

a reduction gear mechanism including
   an eccentric ring fitted to a rotatable member,
   an internally threaded member arranged in a stationary member and having inwardly oriented teeth,
   an externally threaded member having outwardly oriented teeth and capable of undergoing a speed-reduced rotation at a reduction gear ratio of 1/L, where L represents an arbitrarily chosen number exceeding 1, about an axis of eccentric rotation of the eccentric ring when meshed with the internally threaded member, and
   a speed reducing member driven by the externally threaded member to undergo a speed-reduced rotation at the reduction gear ratio of 1/L around the rotatable member at a velocity equal to that of rotation of the externally threaded member on the axis of eccentric rotation;

a multiple rotation detecting unit, capable of outputting a sinusoidal or sawtooth wave having one period during each complete rotation, including
   a to-be-detected member of provided in the speed reducing member, and
   a detecting member arranged in the stationary member so as to confront the to-be-detected member; and a single rotation detecting mechanism having a single rotation detecting unit, which is a rotation detector to output a sinusoidal or sawtooth wave having n periods, where n is a natural number, during each complete rotation, including
   a to-be-detected member provided in the rotatable member, and
   a detecting member disposed in the stationary member so as to confront the to-be-detected member,
   wherein the single rotation detecting unit is operable to output a sinusoidal or sawtooth wave having n periods, where n is a natural number, during each complete rotation of the rotatable member to detect the absolute angle of the rotatable member and the multiple rotation detecting unit is operable to output a sinusoidal or sawtooth wave having one period during each complete rotation of the speed reducing member to detect the absolute angle of the reduction gear mechanism output unit, and
   wherein the value of L in the gear reduction ratio of 1/L of the reduction gear mechanism is chosen to be a non-integer.

2. The absolute multi-rotation angle detecting device as claimed in claim 1, wherein the rotatable member is a rotary shaft.

3. The multiple rotation absolute angle detecting device as claimed in claim 1, wherein the to-be-detected member comprises a magnetic encoder and the detecting member comprises a sensor housing having a Hall IC incorporated therein.

4. The multiple rotation absolute angle detecting device as claimed in claim 3, wherein the sensor housing is molded together with the Hall IC with a resinous material.

5. The multiple rotation absolute angle detecting device as claimed in claim 1, wherein the to-be-detected member comprises a rotor of a resolver and the detecting member comprises a stator of the resolver.

6. The multiple rotation absolute angle detecting device as claimed in claim 1, wherein the internally threaded member comprises an internal gear and the externally threaded member comprises a spur gear.

7. The multiple rotation absolute angle detecting device as claimed in claim 1, further comprising engagements provided in the speed reducing member and the stationary member, or a component part fitted to the stationary member, respectively, to define the range of rotation of the speed reducing member in abutment therewith.

8. The multiple rotation absolute angle detecting device as claimed in claim 1, further comprising a correcting section to modify a signal, outputted from the multiple detecting unit, to an ideal waveform.

9. The multiple rotation absolute angle detecting device as claimed in claim 1, wherein the to-be-detected member of each of the single rotation detecting unit and the multiple rotation detecting unit comprises a magnetic encoder and the detecting member of each of the single rotation detecting unit and the multiple rotation detecting unit comprises a sensor housing having a Hall IC incorporated therein, and
wherein the respective sensor housings of the single rotation detecting unit and the multiple rotation detecting unit are formed integrally with each other.

10. The multiple rotation absolute angle detecting device as claimed in claim 1, wherein the to-be-detected member of the single rotation detecting mechanism comprises a magnetic encoder and the detecting member of the single rotation detecting mechanism comprises a sensor housing having a Hall IC incorporated therein.

11. The multiple rotation absolute angle detecting device as claimed in claim 10, wherein the sensor housing is molded together with the Hall IC of each of the detecting members by means of a resinous material.

12. A multiple rotation absolute angle detection method utilizing the multiple rotation absolute angle detecting device as defined in claim 1,
wherein assuming that the number of periods of the sinusoidal wave or sawtooth wave outputted from the single rotation detecting unit is expressed by n, n being a natural number, the decimal portion $\alpha$ of L in the reduction gear ratio 1/L is selected to be such as expressed by the following formula:

$\alpha \neq \beta/n$, where $0 \leq \beta \leq n-1$, and $\beta$ is an integer.

13. The multiple rotation absolute angle detecting device as claimed in claim 1, wherein the to-be-detected member of the single rotation detecting unit comprises a rotor of a resolver and the detecting member of the multiple rotation detecting unit comprises a stator of the resolver.

14. The multiple rotation absolute angle detecting device as claimed in claim 1, further comprising a correcting section to modify a signal, outputted from the multiple rotation detecting unit or the single rotation detecting unit, to an ideal waveform.

15. The multiple rotation absolute angle detecting device as claimed in claim 1,
wherein the multiple rotation absolute angle detecting device further comprises
a rotational direction determining section to perform a determination of the positive or negative with respect to the original position of the rotatable member with the use of a boundary value calculated from the value of the output signal of the multiple rotation detecting unit according to a predetermined calculating standard,
a rotation number calculating section to calculate the absolute value of the number of rotation based on a result of determination of the positive or negative of the rotational direction by use of the rotational direction determining section and the number of rotations determined from the detected value of the multiple rotation detecting unit, and
a multiple rotation absolute angle calculating section to calculate the absolute rotation angle within the ±L rotations from the original position of the rotatable member, in reference to the absolute value of the number of rotations calculated by the rotation number calculating section and the value of the output of the single rotation detecting unit.

16. The multiple rotation absolute angle detecting device as claimed in claim 15, wherein the rotational direction determining section determines the boundary value on the boundary value curve from the output signal of the multiple rotation detecting unit, while the boundary value curve corresponding to the output waveforms with a displaced phase between the output waveforms during the rotation of the single detecting unit in the positive and negative directions, respectively, is defined, and compares the boundary value with the value of the output signal of the single rotation detecting unit to thereby determine the positive or negative direction of rotation with reference to a predetermined standard.

17. A multiple rotation absolute angle detection method comprising:
utilizing the multiple rotation absolute angle detecting device as defined in claim 15, the value of L in the reduction gear ratio of 1/L of the reduction gear mechanism being a non-integer;
determining the positive or negative relative to the original position of the rotatable member with the use of a boundary value calculated from the value of the output signal of the multiple rotation detecting unit according to a predetermined calculating standards; and
calculating an absolute rotation angle within ±L rotations from the original position of the rotatable member from the number of rotations determined from the output signal of the multiple rotation detecting unit, a result of determination of the positive or negative and the output signal detected by the single rotation detecting unit.

18. The multiple rotation absolute angle detection method utilizing the multiple rotation absolute angle detecting device as defined in claim 17, wherein determining the positive or negative is carried out by determining the boundary value on the boundary value curve from the output signal of the multiple rotation detecting unit, while the boundary value curve corresponding to the output waveforms with a displaced phase between the output waveforms during the rotation of the single detecting unit in the positive and negative directions, respectively is defined, and comparing the boundary value with the value of the output signal of the single rotation detecting unit to thereby determine the positive or negative direction of rotation with reference to the predetermined standard.

19. The multiple rotation absolute angle detection method utilizing the multiple rotation absolute angle detecting device as defined in claim 18, wherein the single rotation detecting unit and the multiple rotation detecting unit output respective sawtooth waves and during determining the positive or negative, the boundary value curve is a curve, in which the output waveform of the single rotation detecting unit is displaced to a point intermediate between the phases during the rotation in the positive direction and that in the negative direction, and the determination of the positive or negative is carried out by taking a difference between the boundary value in the rotation angle, obtained from the output signal of the multiple rotation detecting unit, and the output signal of the single rotation detecting unit, and comparing a combination of a result of determination of the positive and negative of the difference and a result of determination of the magnitude of the difference relative to a predetermined value with a predetermined determining condition to thereby accomplish the determination of the positive or negative.

20. The multiple rotation absolute angle detecting device as claimed in claim 1, being used as a steering sensor of a steering wheel.

21. A multiple rotation absolute angle detecting device incorporated bearing assembly comprising a rotatable raceway ring, a stationary raceway ring, rolling elements, and the multiple rotation absolute angle detecting device as defined in claim 1, and operable to support a rotary shaft,
wherein the rotatable member is the rotatable raceway ring of the bearing assembly and the stationary member is the stationary ring member of the bearing assembly.

22. The multiple rotation absolute angle detecting device incorporated bearing assembly as claimed in claim 21, further comprising:
a single rotation detecting mechanism having a single rotation detecting unit, which is a rotation detecting means to output a sinusoidal or sawtooth wave having n periods, where n is a natural number, during each complete rotation and comprises a to-be-detected member provided in the rotatable member and a detecting member disposed in the stationary member so as to confront the to-be-detected member,
wherein the multiple rotation absolute angle detecting mechanism and the single rotation detecting mechanism are fitted between two rolling bearing units, each comprising a rotatable raceway ring, a stationary raceway ring and rolling elements.

23. The multiple rotation absolute angle detecting device incorporated bearing assembly as claimed in claim 22, wherein the multiple rotation absolute angle detecting mechanism is fitted to one of the rolling bearing units and the single rotation detecting mechanism is fitted to another of the rolling bearing units, and the single rotation detecting mechanism and the multiple rotation absolute angle detecting mechanism are connected with each other.

24. The multiple rotation absolute angle detecting device incorporated bearing assembly as claimed in claim 23, wherein a connection of the stationary raceway ring includes a detecting unit for the single rotation detection or a detecting unit for the multiple rotation detection.

25. The multiple rotation absolute angle detecting device incorporated bearing assembly as claimed in claim 21, further comprising a mechanism to apply a preload to the two rolling bearing units.

26. The multiple rotation absolute angle detecting device incorporated, bearing assembly as claimed in claim 25, wherein the mechanism to apply the preload permits the stationary raceway member of at least one of the two rolling bearing units to be axially movable relative to a stationary side of the single rotation detecting mechanism and the multiple rotation absolute angle detecting mechanism.

27. A multiple rotation absolute angle detection method comprising:
utilizing the multiple rotation absolute angle detecting device as defined in claim 1,
wherein assuming that L of the reduction gear ratio of 1/L is a non-integer, the range of rotations to be detected is ±r, where r represents an integer, and the number of periods of the sinusoidal or sawtooth wave outputted from the single rotation detecting unit of the single rotation detecting mechanism is expressed by n, where n is a natural number, the value L is expressed by the following formula:

$L=r+1/(2n)$.

28. A multiple rotation absolute angle detection method comprising:
utilizing the multiple rotation absolute angle detecting device as defined in claim 1,
wherein the value L of the gear reduction ration of 1/L of the multiple rotation absolute angle detecting mechanism is a non-integer, the range of rotations to be detected is expressed by ±r, where r is an integer, and that the number of periods of the sinusoidal wave or sawtooth wave outputted from the single rotation detecting unit is expressed by n, n being a natural number, and the decimal portion of the L is expressed by $a/n+1/(2n)$, where $0 \leq a < n$ and a is an integer.

* * * * *

UNITED STATES PATENT AND TRADEMARK OFFICE
CERTIFICATE OF CORRECTION

| | | |
|---|---|---|
| PATENT NO. | : 7,772,836 B2 | Page 1 of 1 |
| APPLICATION NO. | : 11/918677 | |
| DATED | : August 10, 2010 | |
| INVENTOR(S) | : Hiroshi Isobe et al. | |

It is certified that error appears in the above-identified patent and that said Letters Patent is hereby corrected as shown below:

Title Page Column 2, Line 1 item (56); Other Publications; delete "Allgro" and insert --Allegro--, therefor.

Signed and Sealed this
Thirty-first Day of May, 2011

David J. Kappos
*Director of the United States Patent and Trademark Office*